(12) United States Patent
Nakamura et al.

(10) Patent No.: US 11,236,488 B2
(45) Date of Patent: Feb. 1, 2022

(54) WORK MACHINE

(71) Applicant: Hitachi Construction Machinery Co., Ltd., Tokyo (JP)

(72) Inventors: Satoshi Nakamura, Hitachinaka (JP); Kunitsugu Tomita, Kashiwa (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 163 days.

(21) Appl. No.: 16/643,187

(22) PCT Filed: Mar. 6, 2019

(86) PCT No.: PCT/JP2019/008972
§ 371 (c)(1),
(2) Date: Feb. 28, 2020

(87) PCT Pub. No.: WO2019/172346
PCT Pub. Date: Sep. 12, 2019

(65) Prior Publication Data
US 2020/0208373 A1 Jul. 2, 2020

(30) Foreign Application Priority Data
Mar. 7, 2018 (JP) .............................. JP2018-041286

(51) Int. Cl.
*E02F 9/20* (2006.01)
*E02F 3/43* (2006.01)
(Continued)

(52) U.S. Cl.
CPC ............ *E02F 9/2029* (2013.01); *E02F 3/431* (2013.01); *E02F 9/24* (2013.01); *E02F 9/265* (2013.01); *G01G 19/08* (2013.01)

(58) Field of Classification Search
CPC ......... E02F 3/431; E02F 3/435; E02F 9/2029; E02F 9/24; E02F 9/265; E02F 9/267; G01G 19/08; G01G 19/083
See application file for complete search history.

(56) References Cited

U.S. PATENT DOCUMENTS 5,493,798 A * 2/1996 Rocke ..................... E02F 3/437
37/348
5,659,470 A * 8/1997 Goska .................. G07C 5/0858
701/33.4
(Continued)

FOREIGN PATENT DOCUMENTS

JP 6-26073 A 2/1994
JP 2002-4336 A 1/2002
(Continued)

OTHER PUBLICATIONS

International Search Report (PCT/ISA/210) issued in PCT Application No. PCT/JP2019/008972 dated May 7, 2019 with English translation (three (3) pages).
(Continued)

*Primary Examiner* — Tyler J Lee
(74) *Attorney, Agent, or Firm* — Crowell & Moring LLP

(57) ABSTRACT

A controller includes a storage device that stores a load overflow reference value defined by a mutual relation between a load value of a work target object, a posture of a work implement, and a movement state of the work implement. The controller calculates the posture of the work implement, and calculates a physical quantity (for example, a swing speed) indicating the movement state of the work implement. The controller estimates whether or not the work implement has caused a load overflow during the transportation of the work target object on the basis of the reference value stored in the storage device, the calculated load value of the work target object, the calculated posture of the work (Continued)

implement, and the calculated physical quantity indicating the movement state of the work implement. When the controller determines that the load overflow has occurred, the controller makes a notification to that effect on a monitor.

7 Claims, 23 Drawing Sheets

(51) Int. Cl.
*E02F 9/24* (2006.01)
*E02F 9/26* (2006.01)
*G01G 19/08* (2006.01)

(56) References Cited

U.S. PATENT DOCUMENTS

| | | | | |
|---|---|---|---|---|
| 7,555,855 | B2* | 7/2009 | Alshaer | E02F 3/434 |
| | | | | 37/382 |
| 8,156,048 | B2* | 4/2012 | Mintah | E02F 9/264 |
| | | | | 705/50 |
| 8,838,331 | B2* | 9/2014 | Jensen | G01N 9/36 |
| | | | | 701/34.4 |
| 9,689,145 | B1* | 6/2017 | Fujii | E02F 9/265 |
| 2004/0158355 | A1* | 8/2004 | Holmqvist | G05D 1/0274 |
| | | | | 700/245 |
| 2007/0260380 | A1* | 11/2007 | Mintah | E02F 9/264 |
| | | | | 701/50 |
| 2009/0228394 | A1 | 9/2009 | Mintah et al. | |
| 2009/0244106 | A1* | 10/2009 | Kuwae | E02F 9/16 |
| | | | | 345/690 |
| 2014/0100744 | A1* | 4/2014 | Johnson | E02F 3/3677 |
| | | | | 701/50 |
| 2014/0116735 | A1* | 5/2014 | Bassett | A01B 63/008 |
| | | | | 172/2 |
| 2015/0345114 | A1* | 12/2015 | Nomura | G01S 19/48 |
| | | | | 37/379 |
| 2017/0167116 | A1 | 6/2017 | Fujii et al. | |
| 2020/0208373 | A1* | 7/2020 | Nakamura | E02F 3/431 |

FOREIGN PATENT DOCUMENTS

| | | |
|---|---|---|
| JP | 2010-253049 A | 11/2010 |
| JP | 2011-17204 A | 1/2011 |
| JP | 2012-229606 A | 11/2012 |
| JP | 2013-1362 A | 1/2013 |
| JP | 5406223 B2 | 2/2014 |
| KR | 10-2015-0041936 A | 4/2015 |
| WO | WO 2008/079192 A1 | 7/2008 |

OTHER PUBLICATIONS

Japanese-language Written Opinion (PCT/ISA/237) issued in PCT Application No. PCT/JP2019/008972 dated May 7, 2019 (three (3) pages).
International Preliminary Report on Patentability (PCT/IB/338 & PCT/IB/373) issued in PCT Application No. PCT/JP2019/008972 dated Sep. 17, 2020, including English translation of document C2 (Japanese-language Written Opinion (PCT/ISA/237) previously filed on Feb. 28, 2020) (six (6) pages).
Korean-language Office Action issued in Korean Application No. 10-2020-7004318 dated Aug. 30, 2021 (five (5) pages).

* cited by examiner

WORK MACHINE

TECHNICAL FIELD

The present invention relates to a work machine including a controller that calculates a load value of a work target object being transported to a position above a transporting machine by a work implement.

BACKGROUND ART

In general, a work machine typified by a hydraulic excavator may perform work (loading work) of loading an excavated object (that may be referred to as a "work target object" in the present document) to a transporting machine as in excavating a mineral in a mine and loading the mineral onto a dump truck, for example.

At a time of such work, when an amount of loading onto the transporting machine (total weight of the work target object on the transporting machine) can be made to be an appropriate amount, it is possible to reduce a decrease in production due to insufficiency of loading or a waste of reloading due to overloading, and thereby improve production efficiency at the site.

As means for making the amount of loading onto the transporting machine an appropriate amount, there is a method of measuring the load of an excavated object during transportation of the excavated object (work target object) by a loading machine, and presenting the load of the excavated object to an operator of a work machine. When the load of the excavated object is presented, the operator of the work machine can grasp the amount of loading onto the transporting machine, adjust amounts of a next and subsequent excavations, and thus make the amount of loading onto the transporting machine an appropriate amount.

A work implement generally continues operating in the work in which the work machine loads the excavated object (work target object) onto the transporting machine. It is thus desirable to measure the load during the operation of the work implement without the operator stopping the loading work to measure the load. Therefore, it is to be determined that the work implement is performing transportation operation, and the measurement is to be completed in a specific period during the transportation operation.

A technology is known which measures a load during transporting work in a device that measures the load of an excavated object being transported by the work machine. Japanese Patent No. 5406223 (Patent Document 1) discloses, as a device measuring the load of the work target object, a payload monitoring system that divides a work cycle of the work machine into a plurality of intervals including a transportation state interval (loaded state movement interval) as an interval in which the excavated object is included in a work tool and transported, determines a period in which the speed of the work tool (tool) of the work machine is substantially constant in the transportation state interval of the work cycle, measures the load of the excavated object (payload of the tool) on the basis of a lifting force of the work tool (tool) which lifting force is recorded during the period, and displays the load.

PRIOR ART DOCUMENT

Patent Document

Patent Document 1: Japanese Patent No. 5406223

SUMMARY OF THE INVENTION

Problems to be Solved by the Invention

The payload monitoring system of Patent Document 1 measures the load of the excavated object (work target object) on the basis of the lifting force of the work tool which lifting force is recorded during the period in which the speed of the work tool is substantially constant and thus accuracy of load measurement is good in ordinary transporting work. However, a load overflow may occur after the load measurement depending on a work environment and operating skills of the operator. When the operator directly performs loading onto the transporting machine without noticing the load overflow, a difference occurs between a load measurement result and an actual loading amount, and thus a work cycle in which high accuracy of the amount of loading onto the transporting machine is not obtained occurs.

The present invention is to make it possible to make a notification of the occurrence of a load overflow in a work machine that calculates the load value of a work target object.

Means for Solving the Problems

The present application includes a plurality of means for solving the above-described problems. To cite an example of the means, there is provided a work machine including: a multijoint type work implement having a bucket; an actuator configured to drive the work implement; an operation device configured to generate a speed command for the actuator according to an operation amount; and a controller configured to calculate a load value of a work target object on a basis of thrust information of the actuator while the work implement is transporting the work target object to a position above a transporting machine; the controller including a storage device configured to store a reference value for estimating whether or not a load overflow of the work target object from the bucket has occurred, the reference value being defined by a mutual relation between the load value of the work target object, a posture of the work implement, and a movement state of the work implement, calculating the posture of the work implement, calculating a physical quantity indicating the movement state of the work implement, estimating whether or not the work implement has caused the load overflow during transportation of the work target object on a basis of the reference value stored in the storage device, the load value of the work target object, the posture of the work implement, and the physical quantity indicating the movement state of the work implement, and further including a notifying device configured to make a notification of determination of occurrence of the load overflow by the controller.

Advantage of the Invention

According to the present invention, the occurrence of the load overflow is estimated on the basis of the load value of the work target object, the posture of the work implement, and the physical quantity indicating the movement state of the work implement. When the occurrence of the load overflow is estimated, the operator of the work implement can be prompted for remeasurement of the load value of the work target object. The accuracy of an amount of loading onto the transporting machine can therefore be improved.

MODES FOR CARRYING OUT THE INVENTION

Embodiments of the present invention will hereinafter be described with reference to the drawings. In the following, description will be made of a case where a hydraulic excavator is used as a loading machine constituting a load measuring system of a work machine, and a dump truck is used as a transporting machine.

The work machine (loading machine) covered by the present invention is not limited to a hydraulic excavator having a bucket as an attachment, but includes hydraulic excavators having an object capable of retaining and releasing an object being transported, such as a grapple, a lifting magnet, or the like. In addition, the present invention is applicable also to wheel loaders and the like having a work arm without a swing function such as that of a hydraulic excavator.

First Embodiment

—General Configuration—

Figure 1:
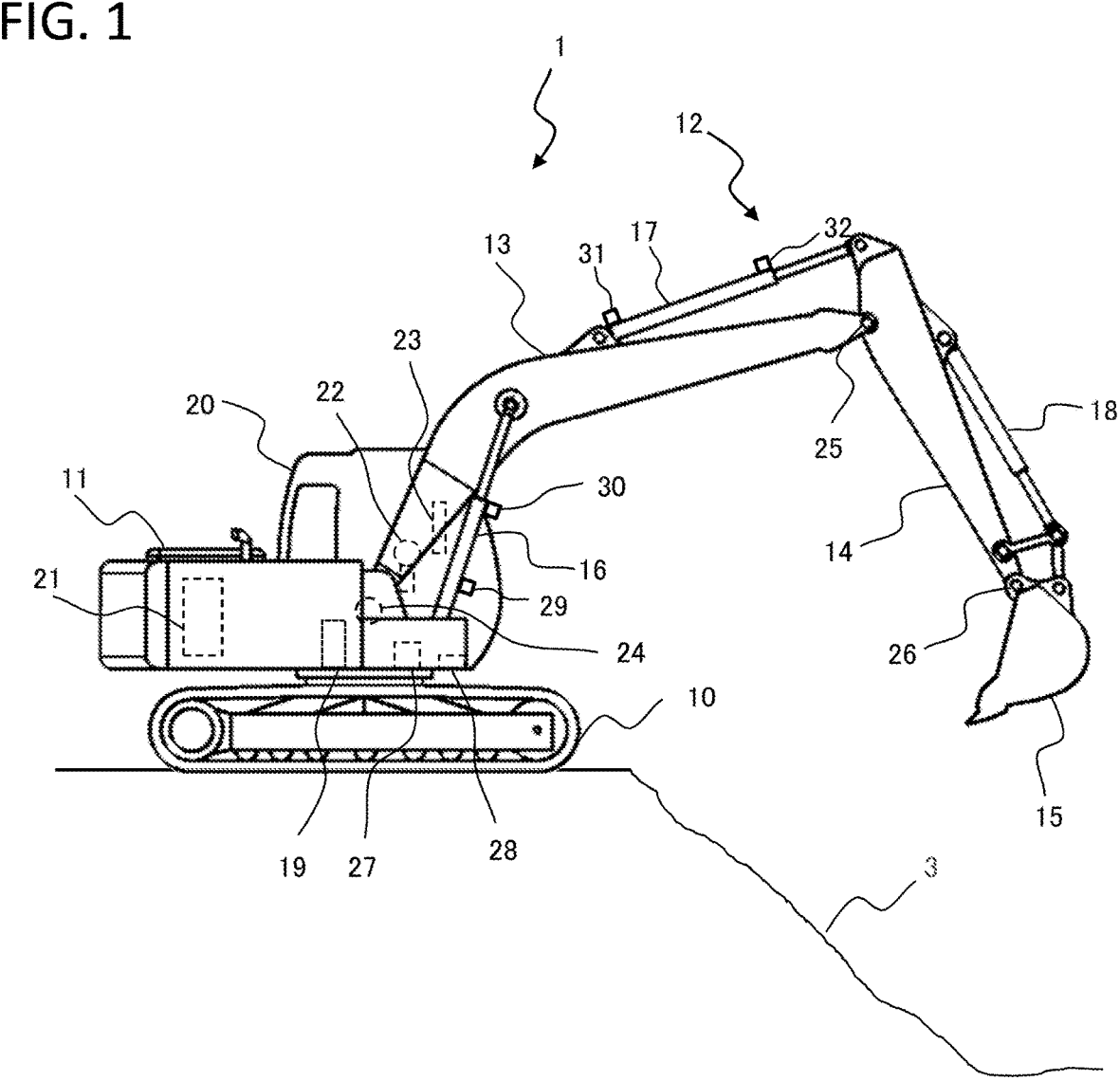
FIG. 1 is a side view of a hydraulic excavator according to an embodiment of the present invention.

FIG. 1 is a side view of a hydraulic excavator according to a present embodiment. The hydraulic excavator 1 in FIG. 1 includes: a lower track structure 10; an upper swing structure 11 disposed so as to be swingable on an upper portion of the lower track structure 10; a front work implement 12 as a multijoint type work arm mounted in front of the upper swing structure 11; a swing motor 19 as a hydraulic motor that rotates the upper swing structure 11; an operation room (cab) 20 that is provided to the upper swing structure 11 and which an operator (operator) boards to operate the excavator 1; control levers (operation device) 22 (22a, 22b) provided within the operation room 20 to control operation of actuators included in the hydraulic excavator 1; and a controller 21 that includes a storage device (for example, a ROM and a RAM), a calculation processing unit (for example, a CPU), and an input-output device, and controls the operation of the hydraulic excavator 1.

The front work implement 12 includes a boom 13 rotatably provided to the upper swing structure 11, an arm 14 rotatably provided to an end of the boom 13, a bucket (attachment) 15 rotatably provided to an end of the arm 14, a boom cylinder 16 as a hydraulic cylinder that drives the boom 13, an arm cylinder 17 as a hydraulic cylinder that drives the arm 14, and a bucket cylinder 18 as a hydraulic cylinder that drives the bucket 15.

A boom angle sensor 24, an arm angle sensor 25, and a bucket angle sensor 26 are attached to pivots of the boom 13, the arm 14, and the bucket 15, respectively. The respective rotational angles of the boom 13, the arm 14, and the bucket 15 can be obtained from these angle sensors 24, 25, and 26. In addition, a swing angular velocity sensor (for example, gyroscope) 27 and an inclination angle sensor 28 are attached to the upper swing structure 11, and are respectively configured to be able to obtain the swing angular velocity of the upper swing structure 11 and the angle of inclination in a front-rear direction of the upper swing structure 11. The posture of the front work implement 12 can be identified from detected values of the angle sensors 24, 25, 26, 27, and 28.

A boom bottom pressure sensor 29, a boom rod pressure sensor 30, an arm bottom pressure sensor 31, and an arm rod pressure sensor 32 are respectively attached to the boom cylinder 16 and the arm cylinder 17, and are configured to be able to obtain pressures within the respective hydraulic cylinders. The thrusts of the respective cylinders 16 and 18, that is, driving forces that can be applied to the front work implement 12 can be identified from detected values of the pressure sensors 29, 30, 31, and 32.

Incidentally, the boom angle sensor 24, the arm angle sensor 25, the bucket angle sensor 26, the inclination angle sensor 28, and the swing angular velocity sensor 27 can be replaced with other sensors as long as the other sensors can detect physical quantities related to the posture of the front work implement 12. For example, each of the boom angle sensor 24, the arm angle sensor 25, and the bucket angle sensor 26 can be replaced with an inclination angle sensor or an inertial measurement unit (IMU). In addition, the boom bottom pressure sensor 29, the boom rod pressure sensor 30, the arm bottom pressure sensor 31, and the arm rod pressure sensor 32 can be replaced with other sensors as long as the other sensors can detect physical quantities related to the thrusts generated by the boom cylinder 16 and the arm cylinder 17, that is, the driving forces that can be applied to the front work implement 12. Further, instead of the detection of the thrusts and the driving forces, the operation of the front work implement 12 may be detected by detecting the operation speeds of the boom cylinder 16 and the arm cylinder 17 by stroke sensors or detecting the operation speeds of the boom 13 and the arm 14 by IMUs.

A monitor (display device) 23 that displays a result of calculation in the controller 21 (for example, the load value of a work target object 4 within the bucket 15 which load value is calculated by a load calculating section 51) or the like is provided within the operation room 20. A radio transceiver (not depicted) for the controller 21 to communicate with an external computer or the like is attached to the top surface of the upper swing structure 11.

The monitor 23 of the present embodiment has a touch panel, and thus functions also as an input device for the operator to input information to the controller 21. A liquid crystal display having the touch panel, for example, can be used as the monitor 23. A reset switch for giving an instruction to reset measurement of an amount of loading of the work target object onto a dump truck (transporting machine) is provided so as to be displayable on the screen of the monitor 23. A reset signal is output to the controller 21 when the switch is depressed.

The control lever 22a gives respective instructions for the raising and lowering of the boom 13 (expansion and contraction of the boom cylinder 16) and the dumping and crowding of the bucket 15 (expansion and contraction of the bucket cylinder 18). The control lever 22b gives respective instructions for the dumping and crowding of the arm 14 (expansion and contraction of the arm cylinder 17) and the left and right swinging of the upper swing structure 11 (left and right rotation of the hydraulic motor 19). The control lever 22a and the control lever 22b are two-composite multifunctional control levers. The forward and rearward operations of the control lever 22a correspond to the raising and lowering of the boom 13. The left and right operations of the control lever 22a correspond to the crowding and dumping of the bucket 15. The forward and rearward operations of the control lever 22b correspond to the dumping and crowding of the arm 14. The left and right operations of the control lever 22b correspond to the left and right rotations of the upper swing structure 11. When a lever is operated in an oblique direction, two corresponding actuators operate at the same time. In addition, operation amounts of the control levers 22a and 22b define the operation speeds of actuators 16 to 19.

Figure 2:
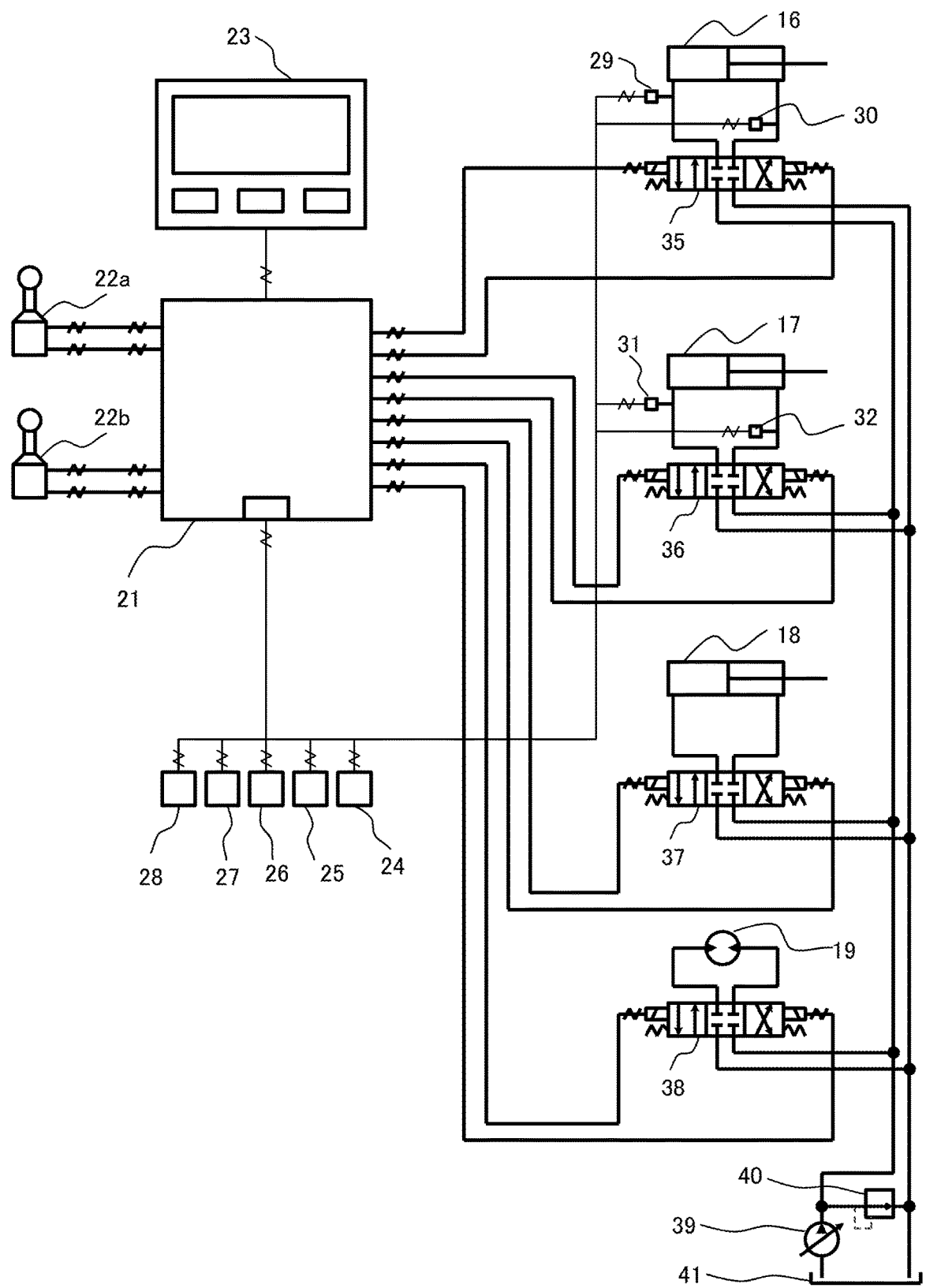
FIG. 2 is a schematic diagram of a hydraulic circuit of the hydraulic excavator according to the embodiment of the present invention.

FIG. 2 is a schematic diagram of a hydraulic circuit of the hydraulic excavator 1 according to the present embodiment. The boom cylinder 16, the arm cylinder 17, the bucket cylinder 18, and the swing motor 19 are driven by a hydraulic operating oil delivered from a main pump 39. The flow rates and circulation directions of the hydraulic operating oil supplied to the respective hydraulic actuators 16 to 19 are controlled by control valves 35, 36, 37, and 38 operated by driving signals output from the controller 21 according to the operation directions and operation amounts of the control levers 22a and 22b.

The control levers 22a and 22b generate operation signals according to the operation directions and operation amounts of the control levers 22a and 22b, and output the operation signals to the controller 21. The controller 21 generates driving signals (electric signals) corresponding to the operation signals, and outputs the driving signals to the control valves 35 to 38 as solenoid proportional valves. The controller 21 thereby operates the control valves 35 to 38.

The operation directions of the control levers 22a and 22b define the operation directions of the hydraulic actuators 16 to 19. When the control lever 22a is operated in a forward direction, a spool of the control valve 35 controlling the boom cylinder 16 moves to a left side in FIG. 2, and supplies the hydraulic operating oil to the bottom side of the boom cylinder 16. When the control lever 22a is operated in a rearward direction, the spool of the control valve 35 moves to a right side in the figure, and supplies the hydraulic operating oil to the rod side of the boom cylinder 16. When the control lever 22b is operated in the forward direction, a spool of the control valve 36 controlling the arm cylinder 17 moves to the left side in the figure, and supplies the hydraulic operating oil to the bottom side of the arm cylinder 17. When the control lever 22b is operated in the rearward direction, the spool of the control valve 36 moves to the right side in the figure, and supplies the hydraulic operating oil to the rod side of the arm cylinder 17. When the control lever 22a is operated in a left direction, a spool of the control valve 37 controlling the bucket cylinder 18 moves to the left side in the figure, and supplies the hydraulic operating oil to the bottom side of the bucket cylinder 18. When the control lever 22a is operated in a right direction, the spool of the control valve 37 moves to the right side in the figure, and supplies the hydraulic operating oil to the rod side of the bucket cylinder 18. When the control lever 22b is operated in the left direction, a spool of the control valve 38 controlling the swing motor 19 moves to the left side in the figure, and supplies the hydraulic operating oil to the swing motor 19 from the left side in the figure. When the control lever 22b is operated in the right direction, the spool of the control valve 38 moves to the right side in the figure, and supplies the hydraulic operating oil to the swing motor 19 from the right side in the figure.

In addition, the valve opening degrees of the control valves 35 to 38 change according to the operation amounts of the corresponding control levers 22a and 22b. That is, the operation amounts of the control levers 22a and 22b define the operation speeds of the hydraulic actuators 16 to 19. For example, when operation amounts in a certain direction of the control levers 22a and 22b are increased, the valve opening degrees of the control valves 35 to 38 corresponding to the direction increase, the flow rates of the hydraulic operating oil supplied to the hydraulic actuators 16 to 19 increase, and thereby the speeds of the hydraulic actuators 16 to 19 increase. Thus, the operation signals generated by the control levers 22a and 22b have an aspect of speed commands to the target hydraulic actuators 16 to 19. Accordingly, in the present document, the operation signals generated by the control levers 22a and 22b may be referred to as speed commands to the hydraulic actuators 16 to 19 (control valves 35 to 38).

The pressure of the hydraulic operating oil delivered from the main pump 39 (hydraulic operating oil pressure) is adjusted so as not to be excessive by a relief valve 40 that communicates with a hydraulic operating oil reservoir 41 under a relief pressure. The return flow passages of the control valves 35 to 38 communicate with the hydraulic operating oil reservoir 41 such that the hydraulic fluid supplied to the hydraulic actuators 16 to 19 return to the hydraulic operating oil reservoir 41 again via the control valves 35 to 38.

The controller 21 is configured to be supplied with signals of the boom angle sensor 24, the arm angle sensor 25, the bucket angle sensor 26, the swing angular velocity sensor 27, and the inclination angle sensor 28, the boom bottom pressure sensor 29 and the boom rod pressure sensor 30 attached to the boom cylinder 16, and the arm bottom pressure sensor 31 and the arm rod pressure sensor 32 attached to the arm cylinder 17. The controller 21 calculates a load on the basis of these sensor signals. A load measurement result is configured to be displayed on the monitor 23.

—System Configuration—

Figure 3:
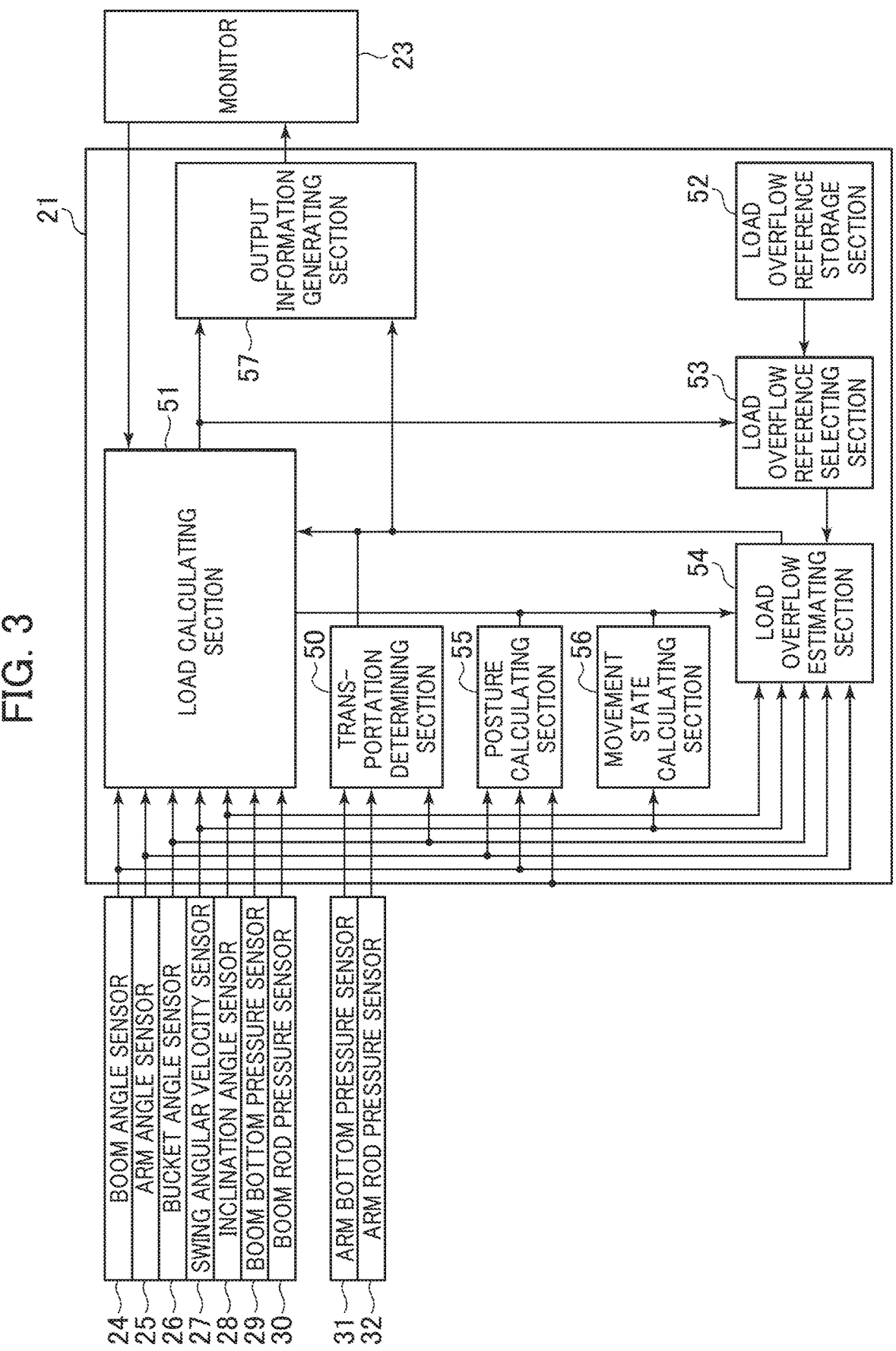
FIG. 3 is a system configuration diagram of a load measurement system according to a first embodiment.

FIG. 3 is a system configuration diagram of a load measurement system according to the present embodiment. The load measurement system according to the present embodiment is implemented as a combination of a few pieces of software within the controller 21, and is configured to be supplied with the signals of the sensors 24 to 32 and a switch signal attached to the monitor 23, calculate the load value of the work target object within the controller 21, and display the load value on the monitor 23.

Within the controller 21 in FIG. 3, functions possessed by the controller 21 are depicted in a block diagram. The controller 21 includes: a posture calculating section 55 that calculates posture information of the front work implement 12 on the basis of detected values of the angle sensors 24 to 28; a movement state calculating section 56 that calculates a physical quantity indicating the movement state of the front work implement 12 (swing speed in the present embodiment); a transportation determining section 50 that determines the time of a start of transportation of the work target object to a position above a bed of the dump truck (transporting machine) by the front work implement 12 (that is, the time of a start of transportation operation) on the basis of load information of the arm cylinder 17 (for example, a detected value of the arm bottom pressure sensor 31); a load calculating section 51 that calculates the load value of the work target object on the basis of thrust information of the boom cylinder 16 (for example, detected values of the bottom pressure sensor 29 and the rod pressure sensor 30 of the boom cylinder 16) operating while the transportation of the work target object to a position above the bed of the dump truck is being performed by the front work implement 12 (that is, during the transportation operation); a load overflow reference storage section 52 that stores reference values for estimating whether or not a load overflow of the work target object from the front work implement 12 has occurred, the reference values being defined by mutual relation between the load value of the work target object, the posture of the front work implement 12, and the movement state of the front work implement 12 (which reference values may hereinafter be referred to as "load overflow reference values" or "load overflow allowable ranges"); a load overflow reference selecting section 53 that selects one reference value from a plurality of the reference values stored in the load overflow reference storage section 52 on the basis of the load value of the work target object, the load value being calculated by the load calculating section 51; a load overflow estimating section 54 that estimates whether or not the front work implement 12 has caused a load overflow during the transportation of the work target object on the basis of the load overflow reference value stored in the load overflow reference storage section 52, the load value of the work target object, the load value being calculated by the load calculating section 51, the posture of the front work implement 12, the posture being calculated by the posture calculating section 55, and the physical quantity indicating the movement state of the front work implement 12, the movement state being calculated by the movement state calculating section 56; and an output information generating section 57 that generates information to be displayed on the monitor 23 on the basis of the outputs of the load calculating section 51 and the load overflow estimating section 54. In addition, the load calculating section 51 is configured to calculate the amount of loading onto the transporting machine 2 by adding up the load of the work target object, and reset the amount of loading onto the transporting machine 2 on the basis of the input of the reset signal output by an addition reset switch 94 provided to the monitor 23 (see FIG. 13A and FIG. 13B).

The movement state calculating section 56 in the present embodiment calculates the moving speed of the front work implement 12, more specifically the swing speed of the upper swing structure 11, as the physical quantity indicating the movement state of the front work implement 12.

Description will next be made of a method by which the load measurement system of the work machine as an example of an embodiment of the present invention corrects an operation instruction of the front work implement 12 on the basis of the posture of the front work implement 12 at the time of a start of a work cycle, and measures a load.

—Definition of Operation of Hydraulic Excavator During Operation of Loading Onto Dump Truck—

Figure 4:
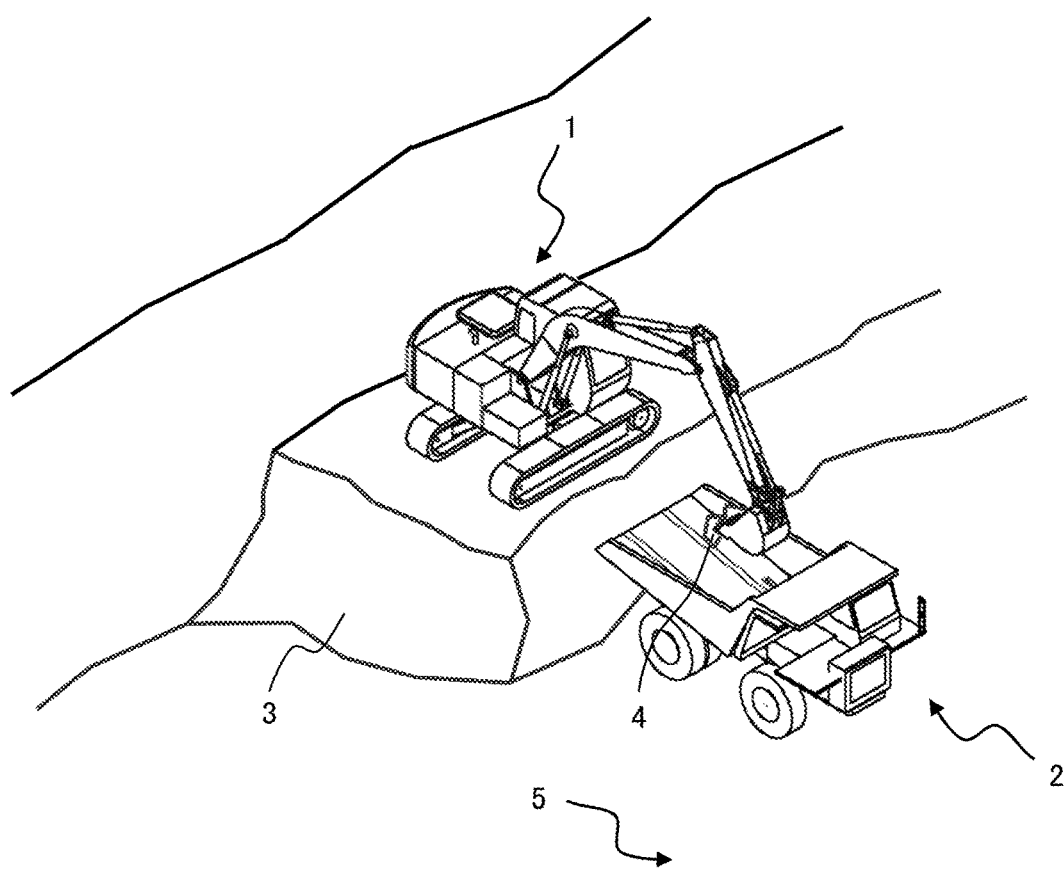
FIG. 4 is an overview diagram depicting an example of work of the hydraulic excavator.

FIG. 4 is an overview diagram depicting an example of work of the hydraulic excavator 1. In the present document, for convenience, "loading work (transporting work)" onto the dump truck (transporting machine) 2 by the hydraulic excavator (loading machine) 1 is defined as work including the following four operations: A) an "excavation operation" of excavating the work target object (transportation object) 3 and loading the work target object (referred to also as an "excavated object") 4 into the bucket 15; B) a "transportation operation" of moving the bucket to a position above the bed of the dump truck 2 by combining swinging of the upper swing structure 11 and operation of the front work implement 12 with each other; C) a "loading operation" of discharging the work target object 4 within the bucket 15 onto the bed of the dump truck 2 (soil discharge); and D) a "reaching operation" of moving the bucket 15 to a desired position on the work target object to start the excavation operation. In many cases, the hydraulic excavator 1 fills the bed of the dump truck 2 with the work target object 4 by repeating the four operations in this order. The transportation operation of B) is performed by swing boom raising in many cases. The loading operation of C) is performed by bucket dumping in many cases.

When an excessive amount of the work target object 4 is loaded onto the frame of the dump truck 2, overloading occurs, and invites a decrease in efficiency of the dump truck 2 or damage to the dump truck 2. In addition, loading an excessively small amount of the work target object 4 represents a small amount of transportation, and thus decreases production at the site. It is therefore desirable to load an appropriate amount onto the dump truck 2.

When an inappropriate operation is performed after measurement of the load of the work target object 4 during the loading work, the work target object 4 within the bucket 15 may overflow. When the operator directly performs loading onto the transporting machine 2 without noticing the overflow, a difference occurs between the measured load of the work target object 4 and a load actually loaded onto the dump truck 2. Therefore, an amount of loading onto the transporting machine 2, the amount being obtained by adding up the load of the work target object 4, and an actual loading amount differ from each other, so that the amount of loading onto the dump truck 2 cannot be managed properly. It is therefore preferable to be able to notify the operator when there is a possibility of an overflow of the work target object 4.

—Transportation Operation Start Determination and Transportation Operation End Determination by Transportation Determining Section 50—

Figure 5:
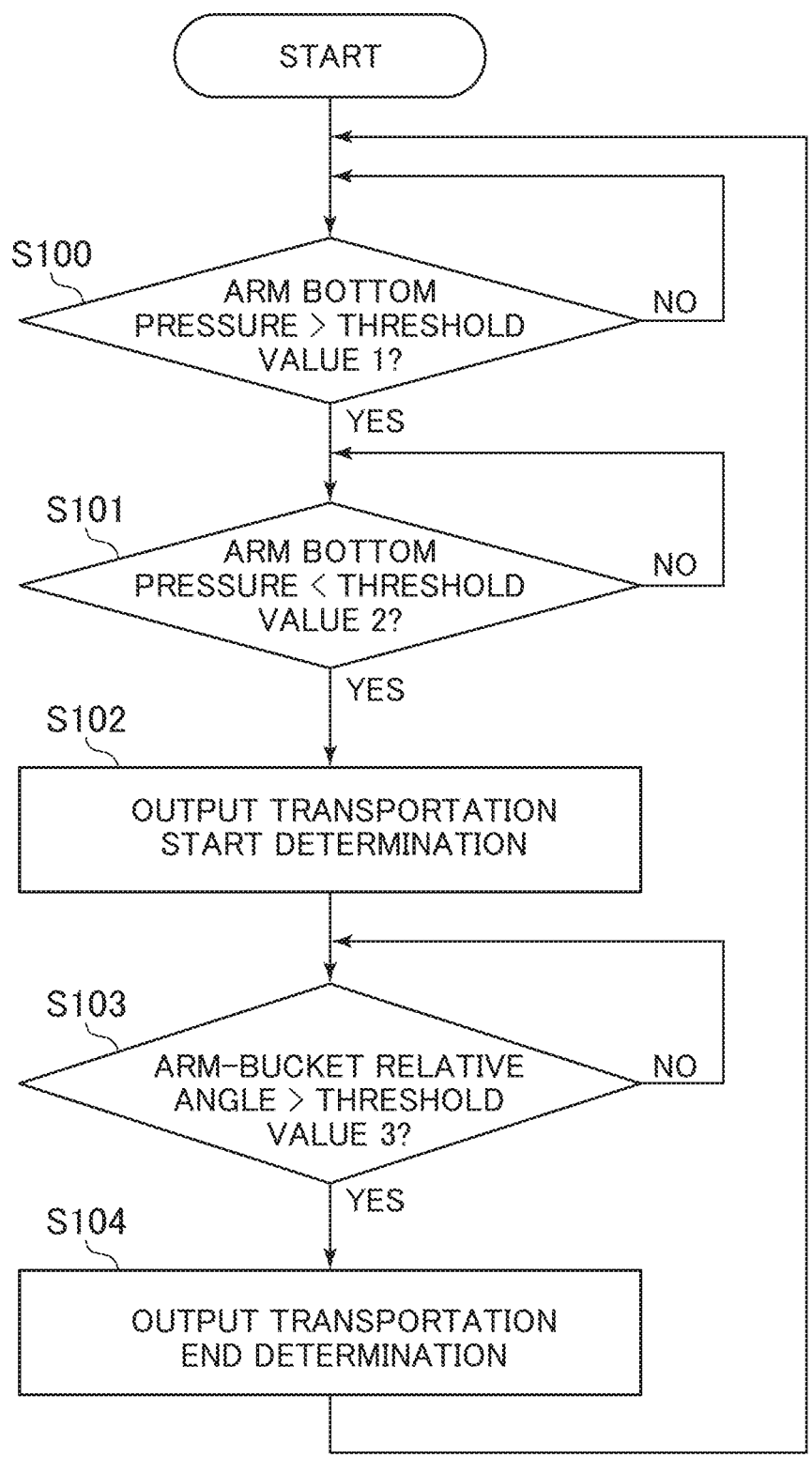
FIG. 5 is a flowchart performed by a transportation determining section in the first embodiment.
Figure 6:
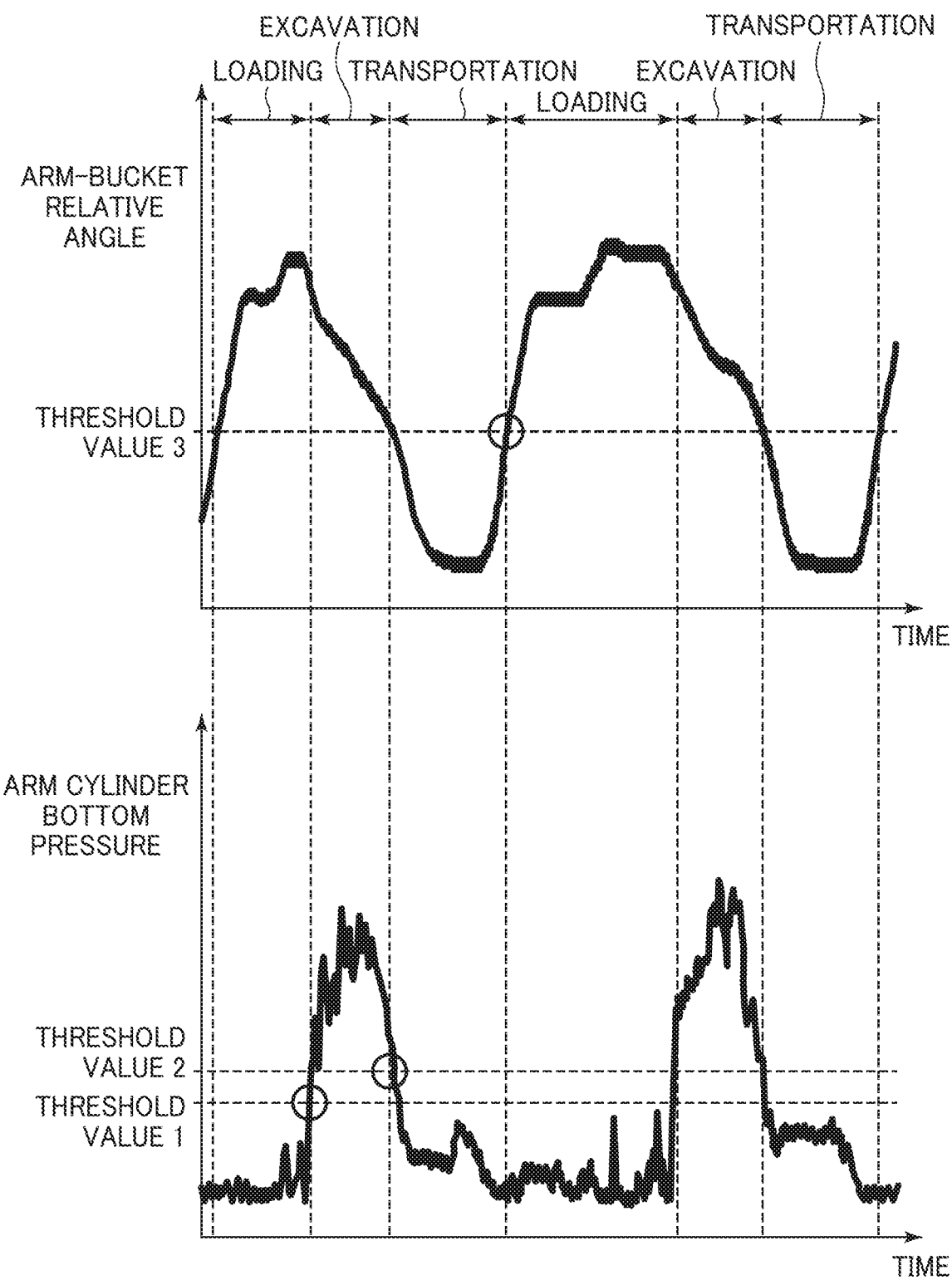
FIG. 6 is an example of a graph depicting a relationship among a detected value of an arm bottom pressure sensor and a detected value of a bucket angle sensor and a result of determination by the transportation determining section 50.

FIG. 5 is a flowchart depicting a method by which the transportation determining section 50 in the controller 21 determines a start and an end of transportation of the work target object 4 onto the bed of the dump truck 2 by the front work implement 12. FIG. 6 is an example of a graph depicting relation between the detected value of the arm bottom pressure sensor 31 (arm cylinder bottom pressure) and the detected value of the bucket angle sensor 26 (arm-bucket relative angle) and a result of determination by the transportation determining section 50.

The flowchart of FIG. 5 is performed in each sampling cycle determined in advance in the controller 21 of the hydraulic excavator 1.

The transportation determining section 50 in step S100 monitors the output of the arm bottom pressure sensor 31, and determines whether or not the output of the arm bottom pressure sensor 31 exceeds a threshold value 1 set in advance from a state of being lower than the threshold value 1. The hydraulic excavator 1 performs excavation by pushing out the arm cylinder 17. The arm cylinder bottom pressure therefore increases during the excavation operation as depicted in a graph on the lower side of FIG. 6. Thus, in the present embodiment, the excavation operation is considered to be started in timing in which the arm bottom pressure exceeds the threshold value 1. When it is determined in step S100 that the arm bottom pressure exceeds the threshold value 1 from the state of being lower than the threshold value 1, the transportation determining section 50 determines that the hydraulic excavator 1 has started the excavation operation. The transportation determining section 50 then proceeds to step S101. Conversely, when the arm bottom pressure does not exceed the threshold value 1 from the state of being lower than the threshold value 1 (when the arm bottom pressure is maintained to be equal to or less than the threshold value 1), the transportation determining section 50 returns to step S100 to continue monitoring the output of the arm bottom pressure sensor 31.

In step S101, the output of the arm bottom pressure sensor 31 continues to be monitored, and whether or not the output of the arm bottom pressure sensor 31 has fallen below a threshold value 2 set in advance from a state of being higher than the threshold value 2 is determined. The arm cylinder bottom pressure is decreased when the excavation operation is ended, as depicted in the graph on the lower side of FIG. 6. Thus, in the present embodiment, it is considered that the excavation operation is ended and the transportation operation is started in timing in which the arm bottom pressure falls below the threshold value 2. When it is determined in step S101 that the arm bottom pressure has fallen below the threshold value 2 from the state of being higher than the threshold value 2, the transportation determining section 50 determines that the hydraulic excavator 1 has ended the excavation operation and started the transportation operation. The transportation determining section 50 then proceeds to step S102. Conversely, when the arm bottom pressure has not fallen below the threshold value 2 from the state of being higher than the threshold value 2 (when the arm bottom pressure keeps equal to or higher than the threshold value 2), the transportation determining section 50 determines that the excavation operation is continued. The transportation determining section 50 then returns to step S101 to continue monitoring the output of the arm bottom pressure sensor 31.

Incidentally, as for relation between the threshold value 1 and the threshold value 2, a relation Threshold Value 1<Threshold Value 2 holds in the example depicted in FIG. 6. However, this is a mere example, and any values can be set in a range in which a start and an end of the excavation operation of the hydraulic excavator 1 can be determined. In addition, in that case, the threshold value 1 and the threshold value 2 may be in any magnitude relation to each other.

In step S102, the transportation determining section 50 outputs a determination that the transportation operation is started (transportation start determination) to the outside. The transportation determining section 50 then proceeds to step S103. Output destinations of the determination at this time include the load calculating section 51.

In step S103, the transportation determining section 50 monitors the output of the bucket angle sensor 26, and determines whether or not a relative angle between the arm and the bucket (angle formed between the arm 14 and the bucket 15) exceeds a threshold value 3 set in advance from an angle smaller than the threshold value 3. The hydraulic excavator 1 that ends the transportation operation and starts the loading operation operates so as to narrow the angle formed between the arm 14 and the bucket 15 in order to discharge a soil (excavation target object) within the bucket 15. That is, as depicted in a graph on the upper side of FIG. 6, the relative angle between the arm 14 and the bucket 15 is increased when a transition is made from the transportation operation to the loading operation. Thus, in the present embodiment, it is considered that the transportation operation is ended and the loading operation is started in timing in which the relative angle between the arm 14 and the bucket 15 exceeds the threshold value 3. When it is determined in step S103 that the arm-bucket relative angle exceeds the threshold value 3, the transportation determining section 50 determines that the hydraulic excavator 1 has ended the transportation operation and started the loading operation. The transportation determining section 50 then proceeds to step S104. Conversely, when it is determined that the arm-bucket relative angle does not exceed the threshold value 3 (when the arm-bucket relative angle keeps smaller than the threshold value 3), the transportation determining section 50 determines that the transportation operation is continued. The transportation determining section 50 then returns to step S103 to continue monitoring the output of the bucket angle sensor 26.

In step S104, the transportation determining section 50 outputs a determination that the transportation operation is ended (transportation end determination) to the outside. The transportation determining section 50 then returns to step S100. Output destinations of the determination at this time include the load calculating section 51.

—Load Overflow Reference Values—

Figure 7:
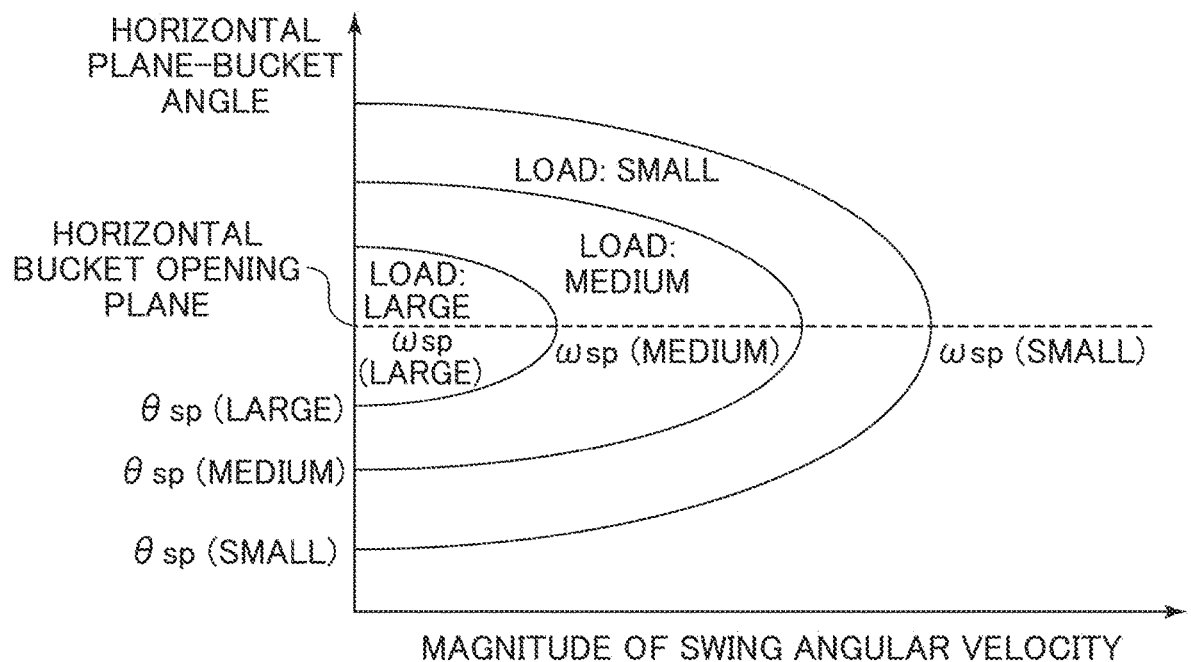
FIG. 7 is a graph depicting load overflow reference values in the first embodiment.
Figure 8:
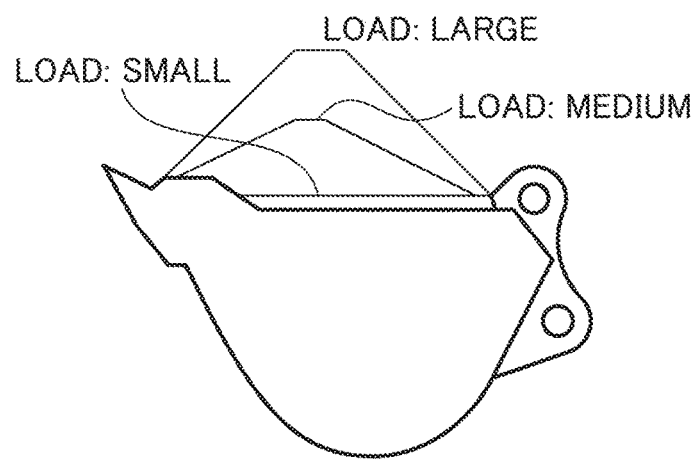
FIG. 8 is a side view of a bucket 15, the side view depicting a method of classifying magnitude of a load.

FIG. 7 is a graph depicting load overflow reference values according to the present embodiment. FIG. 8 is a side view of the bucket 15, the side view depicting a method of classifying the magnitude of the load. The load overflow reference values stored in the load overflow reference storage section 52 will be described with reference to FIG. 7 and FIG. 8. The load overflow reference storage section 52 is a storage area secured within the storage device of the controller 21, and data handled by the load overflow reference storage section 52 is stored in the storage device of the controller 21.

As depicted in the graph of FIG. 7, the load overflow reference values are defined as predetermined regions on an orthogonal coordinate system in which the angle of the opening plane of the bucket 15 with respect to a horizontal plane (which angle may hereinafter be referred to as a "bucket absolute angle" or a "bucket angle") is set as an axis of ordinates (first axis), and the swing angular velocity of the upper swing structure 11 is set as an axis of abscissas (second axis). The regions are a plurality of regions plurally defined for respective load values of the excavated object (work target object) 4. Zero is indicated on the axis of ordinates (bucket angle) when the bucket opening plane is horizontal (dotted line in the figure). Incidentally, as will be described later in detail, large, medium, and small within parentheses in the figure indicate the "magnitude of the load," and do not indicate the bucket angle or the magnitude of the swing angular velocity. For example, θsp (large) is a maximum value of the bucket angle when the load is large, and ωsp (large) indicates a maximum value of the swing angular velocity when the load is large.

When the swing speed of the upper swing structure 11 is increased in a state in which the opening plane of the bucket 15 is horizontal, a centrifugal force or an inertial force acting on the bucket 15 causes a part of the excavated object 4 which part projects from the opening plane of the bucket 15 to overflow and drop. In addition, when the opening plane of the bucket 15 is inclined from a horizontal state, a part of the excavated object 4 which part projects from the opening plane of the bucket 15 overflows and drops easily, and therefore overflows and drops also in a case where the swing speed of the upper swing structure 11 is small. Further, when the opening plane of the bucket 15 is inclined from the horizontal state, an overflow occurs at a certain angle even when the upper swing structure 11 is not swung. In order to express these relations, in the present embodiment, the distribution of the load overflow reference values indicating relations between the absolute angle of the bucket 15 and the magnitude of the swing speed of the upper swing structure 11 in cases where a load overflow occurs is set as semielliptic shapes (a semiellipse may hereinafter be referred to simply as an "ellipse" for convenience) as depicted in FIG. 7. The load overflow estimating section 54 determines that a load overflow has occurred during the transportation of the excavated object 4 when an actual combination of the absolute angle of the bucket 15 and the magnitude of the swing speed of the upper swing structure 11 is included on the outside of an ellipse, and determines that no load overflow has occurred when the actual combination of the absolute angle of the bucket 15 and the magnitude of the swing speed of the upper swing structure 11 is included inside the ellipse.

In a case where the load of the excavated object 4 is large, a large part of the excavated object 4 projects from the opening plane of the bucket 15 as in a drawing to which "load: large" is attached in FIG. 8, and the excavated object 4 overflows easily. Therefore, the size of the ellipse is reduced as represented by an ellipse to which "load: large" is attached in FIG. 7. On the other hand, in a case where the load of the excavated object 4 is small, a small part of the excavated object 4 projects from the opening plane of the bucket 15 as in a drawing to which "load: small" is attached in FIG. 8, and the excavated object 4 does not overflow easily. Therefore, the ellipse is enlarged as represented by an ellipse to which "load: small" is attached in FIG. 7, and a margin occurs in the combination of the absolute angle of the bucket 15 and the magnitude of the swing angular velocity of the upper swing structure 11 which combination does not cause a load overflow.

Incidentally, suppose that the case of "load: large" in FIG. 8 represents a predetermined load value range having, as an upper limit thereof, a load in a case where the gradient of the excavated object is one to one as viewed from a bucket side surface (maximum load), that the case of "load: small" represents a predetermined load value range having, as an upper limit thereof, a load in a case where the upper surface of the excavated object substantially coincides with the opening plane of the bucket 15 as viewed from the bucket side surface, and that the case of "load: medium" represents a load value range having, as an upper limit thereof, a lower limit of the range in the case of "load: large," and having, as a lower limit thereof, the upper limit in the case of "load: small." While three kinds of ellipses (load overflow reference values) corresponding to three kinds of load ranges are defined in the present embodiment, a different number of kinds of load ranges and ellipses may be defined.

Letting θsp (large), θsp (medium), and θsp (small) be respective maximum values of the absolute angle of the bucket 15 with respect to the horizontal plane in the load overflow reference values (ellipses) corresponding to the above-described three kinds of load ranges (large, medium, and small), similarly letting ωsp (large), ωsp (medium), and ωsp (small) be respective maximum values of the swing angular velocity of the upper swing structure 11, letting θbk be the bucket angle, and letting ωsw be the magnitude of the swing angular velocity, regions within the ellipses as ranges in which no load overflow occurs can be expressed by the following Equation (1).

$$(\theta bk)^2/(\theta sp)^2 + (\omega sw)^2/(\omega sp)^2 \leq 1 \tag{1}$$

The load overflow reference values including θsp (large), θsp (medium), θsp (small) as well as ωsp (large), ωsp (medium), and ωsp (small) as constant values can be actually measured in advance and recorded in the load overflow reference storage section 52. For example, the load is set large, medium, and small as depicted in FIG. 8, loading similar to the respective settings is performed, and loads in the states are measured. Then, the absolute angle of the bucket 15 when the opening plane of the bucket 15 is inclined from the horizontal state without being swung in each of the large, medium, and small load states and a load overflow occurs is set as θsp, and the swing angle when the bucket 15 is swung in the horizontal state and a load overflow occurs is set as ωsp.

—Load Value Calculation by Load Calculating Section 51—

Figure 9:
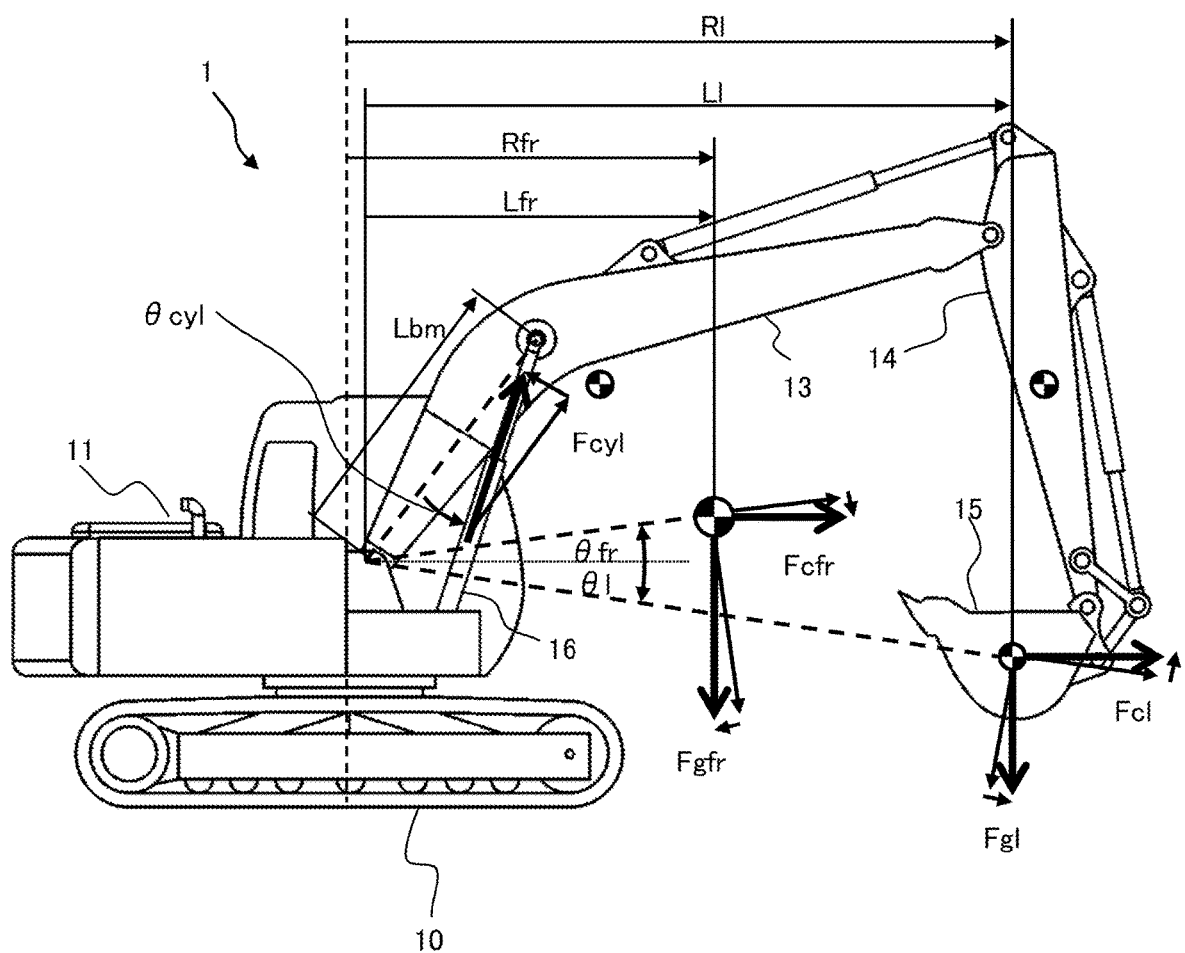
FIG. 9 is a diagram of assistance in explaining a method of calculating a momentary load Ml of a work target object within the bucket 15 by a load calculating section 51 in a controller 21.

FIG. 9 is a diagram of assistance in explaining a method of calculating a momentary load Ml of the work target object within the bucket 15 by the load calculating section 51 in the controller 21. A method by which the load calculating section 51 calculates the load will be described with reference to FIG. 9. The measurement of the load uses a balance between torque acting about the rotational axis of the boom 13 and generated by the boom cylinder 16, torque generated by the front work implement 12 by gravity and swing centrifugal force, and torque generated by the load by gravity and swing centrifugal force.

Letting P1 be the output signal of the boom bottom pressure sensor 29, letting P2 be the output signal of the boom rod pressure sensor 30, and letting A1 and A2 be pressure receiving areas of the boom cylinder 16, a thrust Fcyl of the boom cylinder 16 is calculated by the following Equation (2).

$$Fcyl = A1 \cdot P1 - A2 \cdot P2 \qquad (2)$$

Letting Lbm be the length of a line segment connecting the rotational axis of the boom with a point of action of the thrust of the boom cylinder 16, and letting θcyl be an angle formed between the thrust Fcyl of the boom cylinder 16 and the line segment Lbm in the direction of the thrust, torque Tbm generated by the boom cylinder 16 is calculated by the following Equation (3).

$$Tbm = Fcyl \cdot Lbm \cdot \sin(\theta cyl) \qquad (3)$$

Letting Mfr be the gravity center weight of the front work implement 12, letting g be the acceleration of gravity, letting Lfr be a length in the front-rear direction (length in the front-rear direction of the machine body) from the rotational axis of the boom to the center of gravity of the front implement, and letting θfr be an angle formed between a line segment connecting the rotational axis of the boom to the center of gravity of the front implement and the horizontal plane, torque Tgfr generated by the front work implement 12 by gravity is calculated by the following Equation (4).

$$Tgfr = Mfr \cdot g \cdot Lfr \cdot \cos(\theta fr) \qquad (4)$$

Letting Rfr be a length in the front-rear direction from the swing center of the upper swing structure 11 to the center of gravity of the front implement, and letting ω be the swing angular velocity, torque Tcfr generated by the front work implement 12 by swing centrifugal force is calculated by the following Equation (5).

$$Tcfr = Mfr \cdot Rfr \cdot \omega^2 \cdot \sin(\theta fr) \qquad (5)$$

Incidentally, Mfr, Lfr, Rfr, and θfr are calculated from the respective lengths, gravity center positions, and weights of the upper swing structure 11, the boom 13, the arm 14, and the bucket 15, the lengths, the gravity center positions, and the weights being set in advance, and angle signals output from the boom angle sensor 24, the arm angle sensor 25, and the bucket angle sensor 26.

Letting Ml be the weight of the load, letting L1 be a length in the front-rear direction from the rotational axis of the boom to the center of gravity of the bucket, and letting θl be an angle formed between a line segment connecting the rotational axis of the boom to the center of gravity of the load and the horizontal plane, torque Tgl generated by the load by gravity is calculated by the following Equation (6).

$$Tgl = Ml \cdot g \cdot L1 \cdot \cos(\theta l) \qquad (6)$$

Letting Rl be a length in the front-rear direction from the swing center of the upper swing structure 11 to the center of gravity of the bucket, torque Tcl generated by the load by swing centrifugal force is calculated by the following Equation (7).

$$Tcl = Ml \cdot Rl \cdot \omega^2 \cdot \sin(\theta l) \qquad (7)$$

When balances between Equations (3) to (7) are modified and expanded with respect to the load weight Ml, the load weight Ml is calculated by the following Equation (8).

$$Ml = (Tbm - Tgfr - Tcfr)/(L1 \cdot g \cdot \cos(\theta l) + Rl \cdot \omega^2 \cdot \sin(\theta l)) \qquad (8)$$

The calculation of the load by Equations (2) to (8) may be unable to output a constant value at all times during the transportation operation due to the noise of the sensors, the characteristics of the hydraulic circuit, and the like. Thus, the load weight Ml in a predetermined period during the transportation operation is averaged, and the load value is determined.

—Load Value Determination Processing and Load Overflow Estimation Processing—

Figure 10:
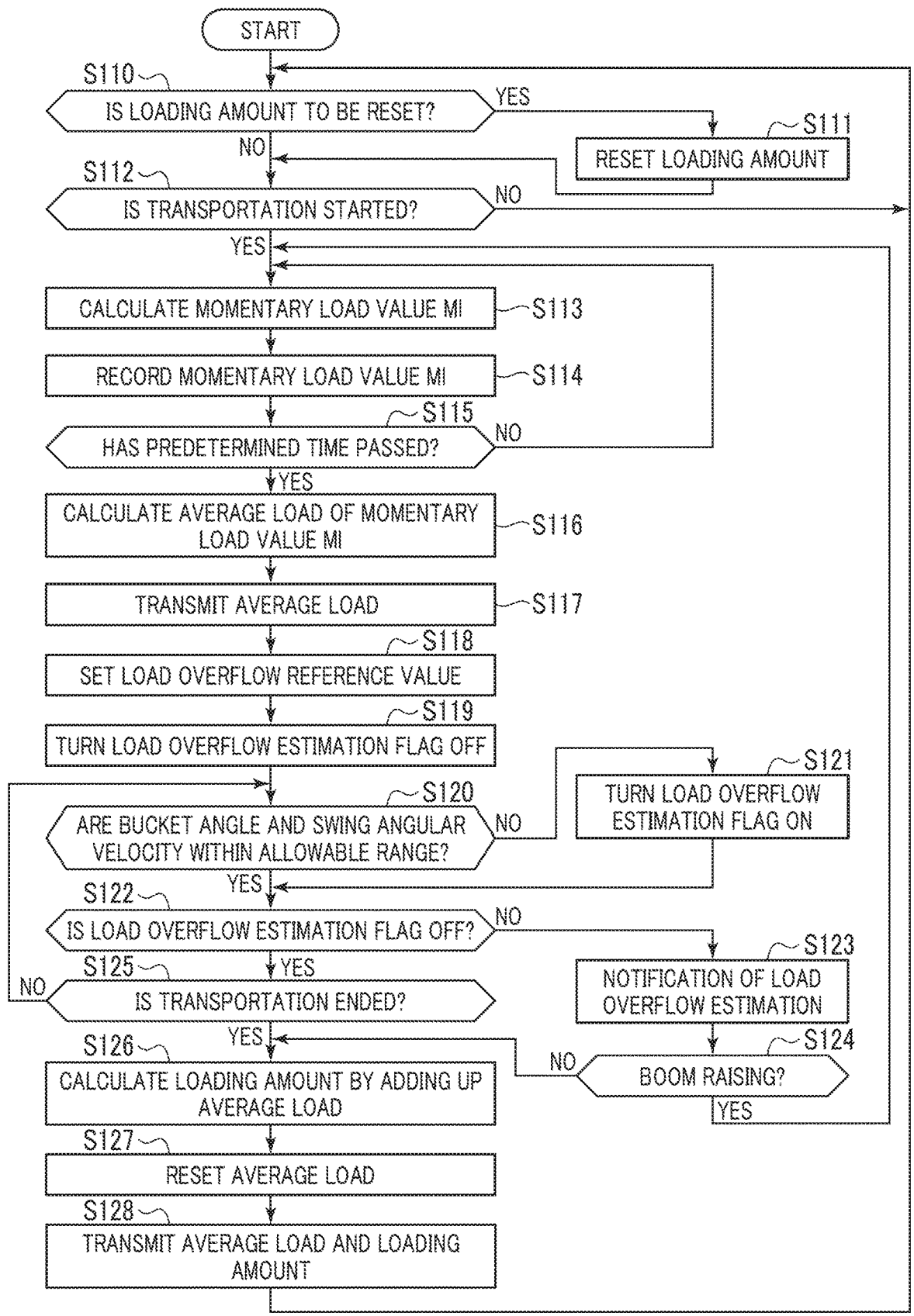
FIG. 10 is a flowchart depicting load value determination processing and load overflow estimation processing performed by the controller 21 according to the first embodiment.
Figure 11:
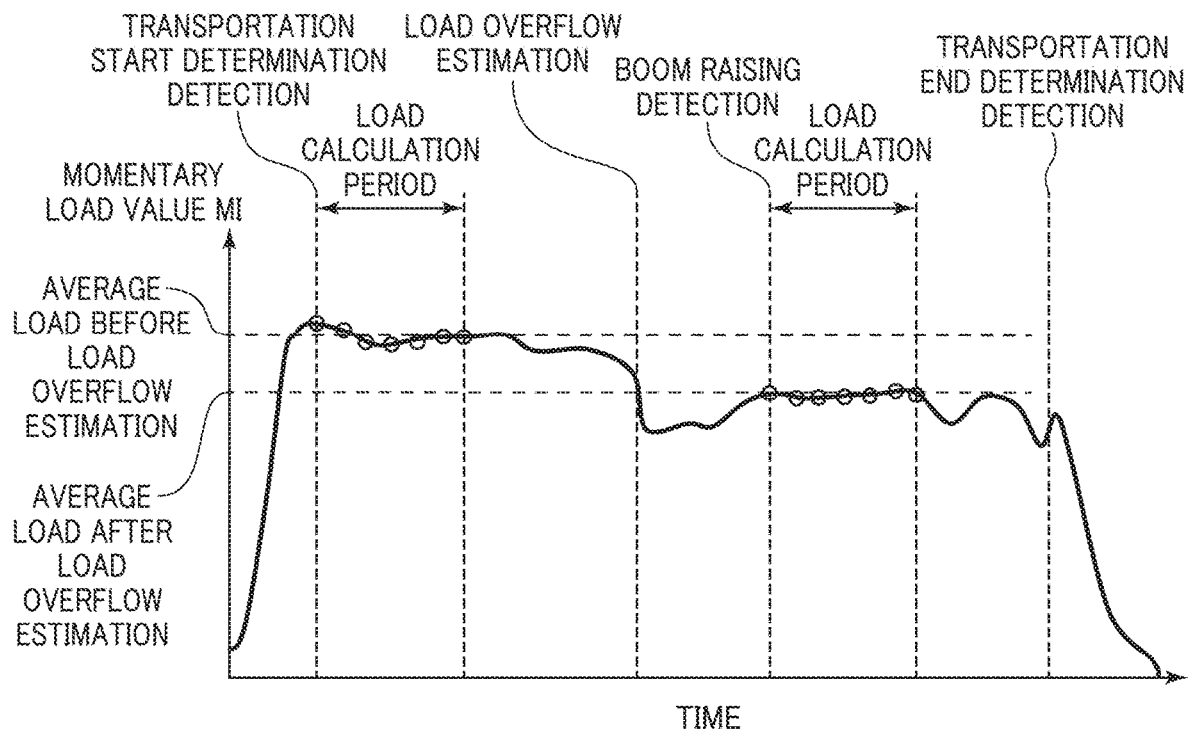
FIG. 11 is a graph depicting temporal changes in the momentary load value Ml.
Figure 12:
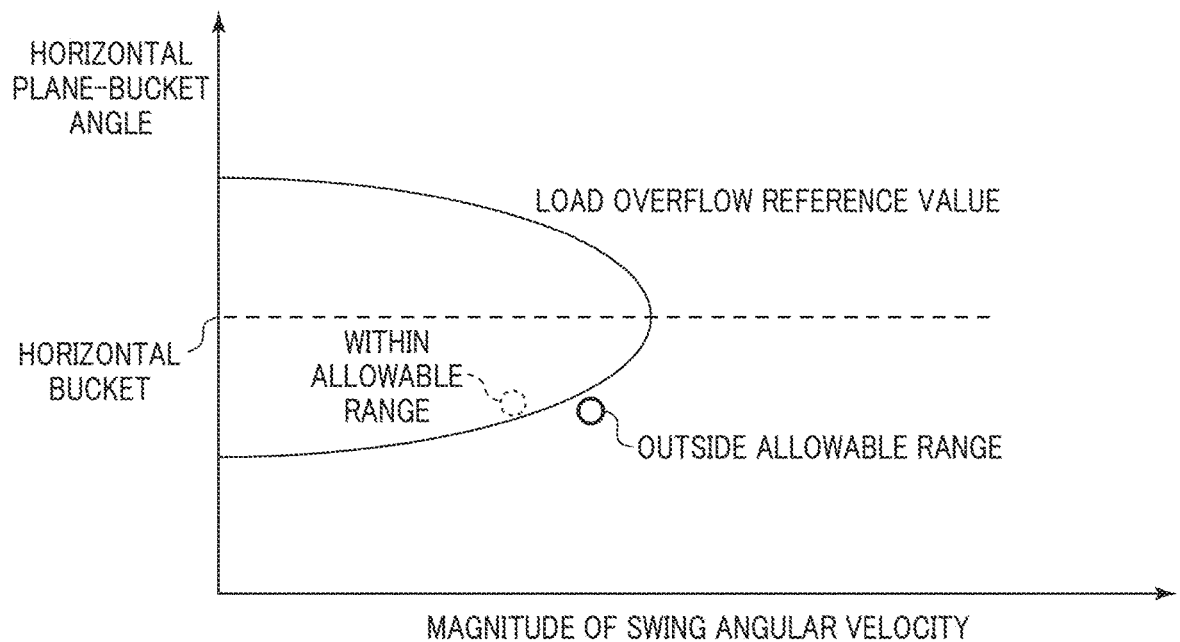
FIG. 12 is an explanatory diagram of a graph (load overflow reference value) used when the occurrence of a load overflow during transportation is estimated.

FIG. 10 is a flowchart depicting load value determination processing and load overflow estimation processing performed by the controller 21 according to the first embodiment. FIG. 11 is a graph depicting temporal changes in the momentary load value Ml. FIG. 12 is an explanatory diagram of a graph (load overflow reference value) used when the occurrence of a load overflow during transportation is estimated. Referring to FIGS. 10 to 12, description will be made of a method by which the load calculating section 51 determines a load during the transportation operation of the hydraulic excavator 1, the load overflow reference selecting section 53 then selects a load overflow reference value on the basis of the load value, and the load overflow estimating section 54 estimates the presence or absence of a load overflow on the basis of the selected load overflow reference value.

The flowchart of FIG. 10 is performed in predetermined sampling cycles in the controller 21.

The load calculating section 51 determines in step S110 whether or not a loading amount reset signal is output from the monitor 23. When the reset signal is not output, the load calculating section 51 proceeds to step S112. When the reset signal is output, the load calculating section 51 resets the amount of loading onto the transporting machine 2 in step S111. The load calculating section 51 then proceeds to step S112.

In step S112, the load calculating section 51 monitors whether or not a transportation start determination is output from the transportation determining section 50. When the transportation start determination is output, the load calculating section 51 proceeds to step S113. The load calculating section 51 otherwise returns to step S110 to monitor the output of the monitor 23 and the transportation determining section 50.

The load calculating section 51 calculates the momentary excavated object weight (momentary load value) Ml by performing the calculation of the above Equations (2) to (8) in step S113, and next records the momentary load value Ml in step S114. The load calculating section 51 then proceeds to step S115.

In step S115, the load calculating section 51 determines whether or not a predetermined time has passed since the output of the transportation start determination from the transportation determining section 50 (the predetermined time may be referred to as a "load calculation period"). When the predetermined time has not passed, the load calculating section 51 returns to step S113 to perform step S113 and S114 again. When the predetermined time has passed, on the other hand, the load calculating section 51 proceeds to step S116.

In step S116, the load calculating section 51 calculates an average load value of the momentary load value Ml calculated in the predetermined time. The momentary load value Ml during the load calculation period differs at each time of sampling, as depicted in FIG. 11. Thus, the load value is determined by taking an average of values calculated during the load calculation period. When the load value is determined in step S116, the load calculating section 51 transmits the determined load value to the output information generating section 57 (step S117). The load calculating section 51 then proceeds to step S118. The output information generating section 57 updates the numerical value of a load-being-transported display section 93 on the screen of the monitor 23 on the basis of the load value input in step S117.

In step S118, the load overflow reference selecting section 53 classifies the magnitude of the load value Ml of the excavated object 4 which load value is calculated in step S116 into three large, medium, and small magnitudes on the basis of threshold values set in advance, and selects a reference value matching the classified load value of the excavated object 4 from among the load overflow reference values (load overflow allowable ranges) in three elliptic forms which reference values are recorded in the load overflow reference storage section 52 in FIG. 7. Then, the load overflow reference selecting section 53 outputs the selected load overflow reference value to the load overflow estimating section 54, sets the selected load overflow reference value as the load overflow reference value, and proceeds to step S119. In the following, description will be continued supposing that a load overflow reference value depicted in FIG. 12 is selected and set in step S118.

In step S119, the load overflow estimating section 54 sets a load overflow estimation flag, which is set to ON when a load overflow is estimated, to OFF. The load overflow estimating section 54 then proceeds to step S120.

In step S120, the load overflow estimating section 54 determines whether or not the present absolute angle of the bucket 15 with respect to the horizontal plane and the magnitude of the present swing angular velocity of the upper swing structure 11 satisfy the relation expressed by Equation (1) on the basis of the reference value set in step S118, the present absolute angle of the bucket 15 with respect to the horizontal plane, the absolute angle being input from the posture calculating section 55, and the magnitude of the present swing angular velocity of the upper swing structure 11, the swing angular velocity being input from the movement state calculating section 56. When determining that the relation of Equation (1) is satisfied (that is, when determining that the combination of the bucket angle and the swing angular velocity is within an allowable range as indicated by a dotted line circle in FIG. 12), the load overflow estimating section 54 assumes that no load overflow has occurred. The load overflow estimating section 54 then proceeds to step S122. Conversely, when determining that the relation of Equation (1) is not satisfied (that is, when determining that the combination of the bucket angle and the swing angular velocity is outside the allowable range as indicated by a solid line circle in FIG. 12), the load overflow estimating section 54 assumes that a load overflow has occurred and sets the load overflow estimation flag to ON in step S121. The load overflow estimating section 54 then proceeds to step S122.

In step S122, the load overflow estimating section 54 determines whether or not the load overflow estimation flag is ON. When the load overflow estimation flag is OFF, the load overflow estimating section 54 proceeds to step S125. When the load overflow estimation flag is ON, the load overflow estimating section 54 proceeds to step S123.

In step S125, the load calculating section 51 monitors whether or not a transportation end determination (step S104) is output from the transportation determining section 50. When the transportation end determination is not detected, the load calculating section 51 returns to step S120, and determination of the presence or absence of a load overflow by the load overflow estimating section 54 is continued. When the transportation end determination is detected, the load calculating section 51 proceeds to step 126.

In step S123, the output information generating section 57 notifies the operator of load overflow estimation by generating a load overflow notifying message 95, and displaying the load overflow notifying message 95 on the monitor 23 (see FIG. 13B to be described later). The output information generating section 57 then proceeds to step S124. The load overflow notifying message 95 is displayed on the monitor 23 at least during a period during which the load overflow estimation flag is ON.

In step S124, the load calculating section 51 checks the output of the boom angle sensor 24, and determines whether or not boom raising is detected in a period before the detection of the transportation end determination. When boom raising is detected before the transportation end determination, the load calculating section 51 assumes that the operator has started remeasurement of the load value on the basis of the load overflow notifying message 95, and returns to step S113 to measure the load again. As depicted in FIG. 11, when boom raising is detected after a load overflow is estimated, the momentary load value Ml is measured again during a predetermined period after the detection of boom raising, and the load value is updated. When boom raising cannot be detected in step S124, on the other hand, the load calculating section 51 assumes that a load overflow is estimated but the operator has ended the transportation operation without remeasurement. The load calculating section 51 then proceeds to step S126.

In step S126, the load calculating section 51 calculates an amount of loading onto the transporting machine 2 by adding up the average load calculated in step S116. In step S127, the load calculating section 51 resets the average load calculated in step S116. In step S128, the load calculating section 51 outputs, to the output information generating section 57, the amount of loading onto the transporting machine 2 which amount is calculated in step S126 and the average load value reset in step S127. The load calculating section 51 then returns to step S110. The output information generating section 57 updates display on the basis of the output in step S128.

Figure 13A:
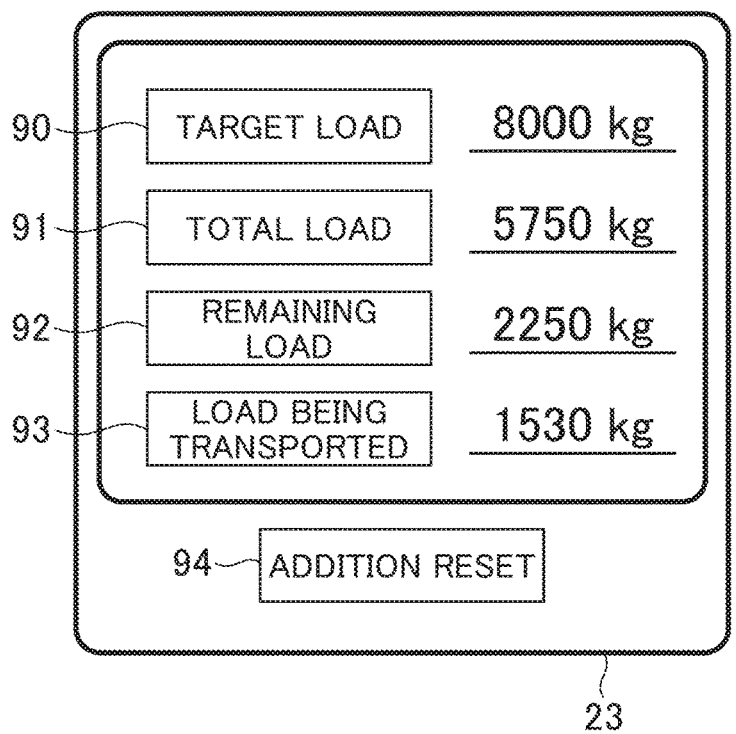
FIG. 13A is an external view depicting an output screen of a monitor 23 when no load overflow is estimated (when a load overflow estimation flag is OFF).
Figure 13B:
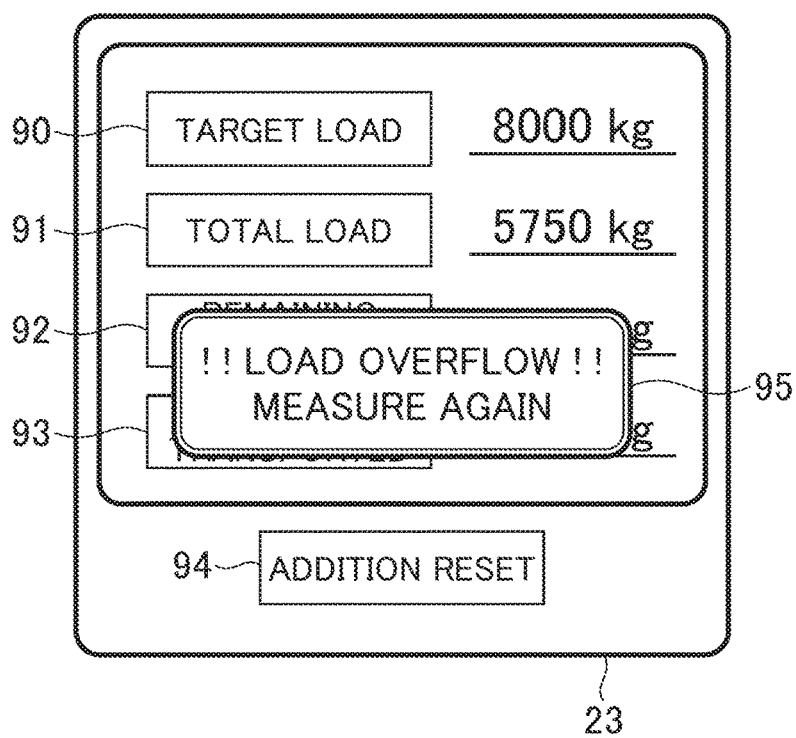
FIG. 13B is an external view depicting the output screen of the monitor 23 when a load overflow is estimated (when the load overflow estimation flag is ON).

FIG. 13A and FIG. 13B are external views depicting the output screen of the monitor 23 according to the present embodiment. FIG. 13A is the output screen when no load overflow is estimated (when the load overflow estimation flag is OFF). FIG. 13B is the output screen when a load overflow is estimated (when the load overflow estimation flag is ON). Referring to FIGS. 13A and 13B, description will be made of a method by which the output information generating section 57 changes display on the monitor 23 according to a load measurement result and a load overflow estimation result.

The output screen (display screen) of the monitor 23 is provided with a target load display section 90, a total load display section 91, a remaining load display section 92, a load-being-transported display section 93, and an addition reset switch 94. A target load value displayed in the target load display section 90 is set in advance on the basis of the vessel capacity of each dump truck 2. A total load value displayed in the total load display section 91 is the amount of loading onto the transporting machine 2 (integrated value of the average load value) which amount is calculated in step S126 in FIG. 10, and is reset to zero in timing in which the addition reset switch 94 is depressed. A remaining load value displayed in the remaining load display section 92 is a value obtained by subtracting the total load value in the total load display section 92 from the target load value in the target load display section 90. The load-being-transported display section 93 displays the load value being transported which load value is calculated in step S116 in FIG. 10, and is reset to zero in timing of step S129. During a period during which the load overflow estimation flag is ON in step S123 in FIG. 9, the output information generating section 57 generates the load overflow notifying message 95, and displays the load overflow notifying message 95 in a state of being superposed on the monitor 23 as depicted in FIG. 13B. A message or a figure prompting the operator for immediate execution of boom raising may be added to the load overflow notifying message 95.

Operation and Effect

When the hydraulic excavator configured as described above starts the excavation operation of excavating the work target object 4 by the front work implement 12 by performing arm crowding operation, the bucket 15 comes into contact with the ground surface, and the arm cylinder bottom pressure rises to exceed the threshold value 1. When the excavation is thereafter ended and an arm cylinder load is reduced, the arm cylinder bottom pressure is decreased to equal to or less than the threshold value 2, and the transportation determining section 50 outputs the transportation start determination (S102 in FIG. 5). In a transportation operation following the excavation operation, an operation of transporting the work target object 4 to a position above the bed of the dump truck 2 by swing boom raising is performed. During this transportation operation, the controller 21 performs the processing of steps S113 to S122 in FIG. 10. Specifically, first, the load calculating section 51 calculates the momentary load value Ml and the average load value (steps S113 to S116). Then, the load overflow estimating section 54 sets a load overflow reference value suitable for the average load value (step S118), and estimates whether or not a load overflow has occurred by determining whether or not the combination of the bucket angle calculated by the posture calculating section 55 and the swing angular velocity calculated by the movement state calculating section 56 is positioned within an ellipse defining the load overflow reference value in a period after the calculation of the average load value and before the output of the transportation operation end determination (step S120). When this determination estimates that a load overflow has occurred, the load overflow notifying message 95 (FIG. 13B) is displayed on the screen of the monitor 23 (step S123). The operator is thereby notified of the occurrence of the load overflow during the transportation operation (that is, before soil discharge of the excavated object 4 onto the dump truck 2 by bucket dumping). Recognizing the notifying message 95, the operator immediately performs boom raising again (step S124). The load calculating section 51 thus calculates the average load value of the excavated object 4 after the load overflow (steps S113 to S116). When the load calculating section 51 completes calculating the average load value, the numerical value of the load-being-transported display section 93 on the monitor 23 is updated (step S117). By recognizing the update of the numerical value, the operator can grasp that the calculation of the average load value of the excavated object 4 after the load overflow is completed, and can smoothly shift to a subsequent loading operation. Thereafter, the average load value of the excavated object 4 after the load overflow is added up as an amount of loading onto the dump truck 2 (step S126).

When the occurrence or nonoccurrence of a load overflow is thus determined during the transportation operation, the operator no longer overlooks the load overflow after average load measurement. At a time of occurrence of the load overflow, the amount of loading onto the dump truck 2 can be calculated with high accuracy by remeasurement of the average load value.

Second Embodiment

Figure 14:
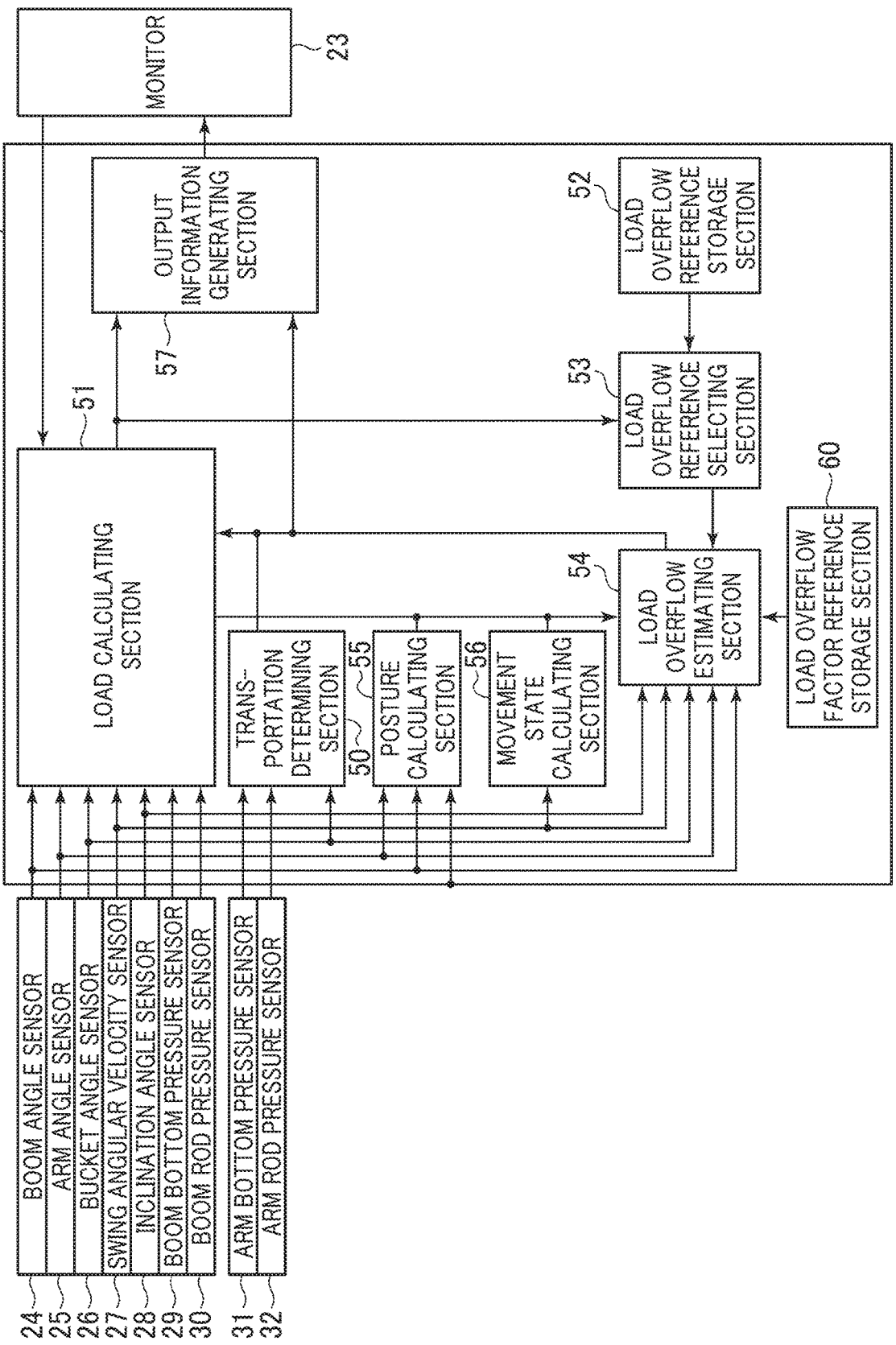
FIG. 14 is a system configuration diagram of a load measurement system according to a second embodiment.

A second embodiment of the present invention will next be described. FIG. 14 is a system configuration diagram of a load measurement system according to the second embodiment. The same parts as in the previous embodiment are identified by the same reference numerals, and description thereof may be omitted. In addition to each configuration of the first embodiment, the controller 21 according to the present embodiment functions as a load overflow factor reference storage section 60 storing a reference value for distinguishing which of the posture (bucket angle) and the movement state (swing angular velocity) of the front work implement 12 is a load overflow factor (which reference value may be referred to as a "load overflow factor reference value"). The load overflow factor reference storage section 60 is a storage area secured within the storage device of the controller 21, and data handled by the load overflow factor reference storage section 60 is stored in the storage device of the controller 21.

Figure 15:
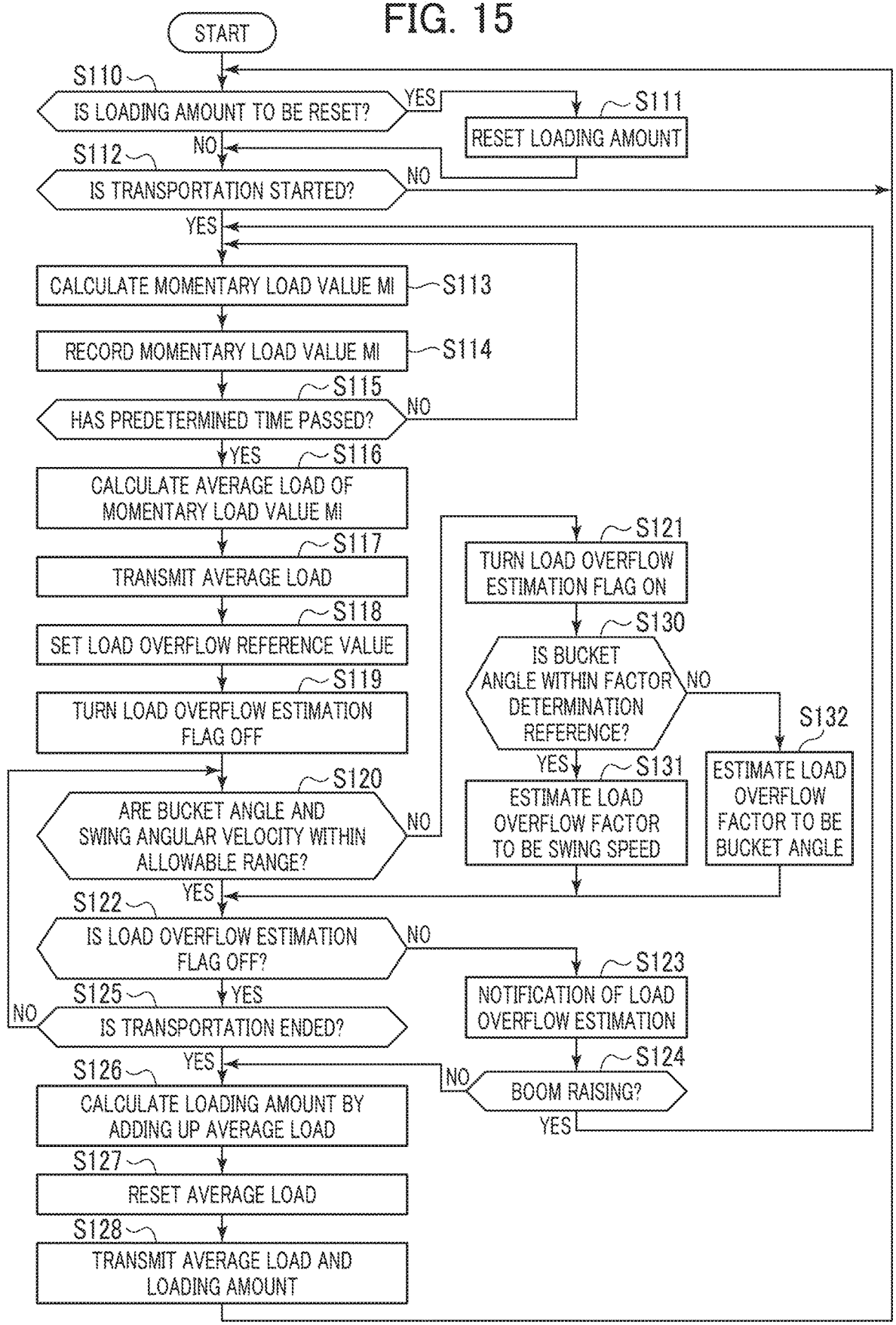
FIG. 15 is a flowchart of processing performed by a controller 21 according to the second embodiment.

FIG. 15 is a flowchart of processing performed by the controller 21 according to the second embodiment, and is different from FIG. 10 of the first embodiment in that the processing of steps S130, 131, and 132 is performed after step S121. Steps identified by the same references as in FIG. 10 are the same steps as in FIG. 10, and therefore description thereof will be omitted.

Figure 16:
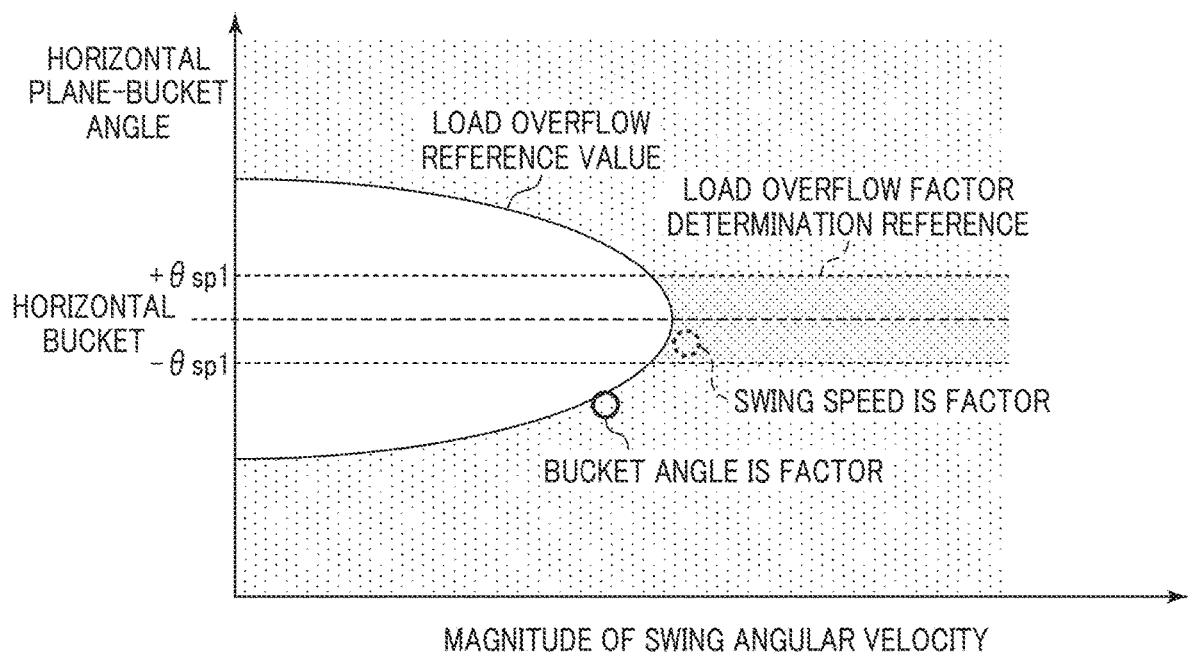
FIG. 16 is a diagram of assistance in explaining a load overflow factor reference value according to the second embodiment.

After the load overflow estimating section 54 determines that a load overflow has occurred in step S120 and sets the load overflow estimation flag to ON in step S121, the load overflow estimating section 54 determines a load overflow factor on the basis of whether or not the absolute angle of the bucket 15 is within a load overflow factor determination reference value in step S130. FIG. 16 is a diagram of assistance in explaining a load overflow factor reference value according to the present embodiment. The load overflow factor reference value according to the present embodiment is defined in a predetermined range including zero where the absolute angle of the bucket 15 is horizontal. In the example of FIG. 16, the bucket absolute angle of the load overflow factor reference value is set in a range of $-\theta sp1$ (lower limit value) to $+\theta sp1$ (upper limit value).

When the load overflow estimating section 54 determines in step S130 that the absolute angle of the bucket 15 is included within the load overflow factor determination reference value (that is, when the load overflow estimating section 54 determines that the bucket absolute angle is within the load overflow factor determination reference value as indicated by a dotted line circle in FIG. 16), the load overflow estimating section 54 estimates that a main factor in the load overflow is the "swing speed" in step S131, and outputs a result of the estimation to the output information generating section 57. On the other hand, when the load overflow estimating section 54 determines that the absolute angle of the bucket 15 is not within the load overflow factor determination reference (that is, when the load overflow estimating section 54 determines that the bucket absolute angle is outside the load overflow factor determination reference value as indicated by a solid line circle in FIG. 16), the load overflow estimating section 54 estimates that the main factor in the load overflow is the "angle of the bucket 15" in step S132, and outputs a result of the estimation to the output information generating section 57. When the load overflow estimating section 54 ends the processing of one of steps S131 and S132, the load overflow estimating section 54 proceeds to step S122.

Figure 17:
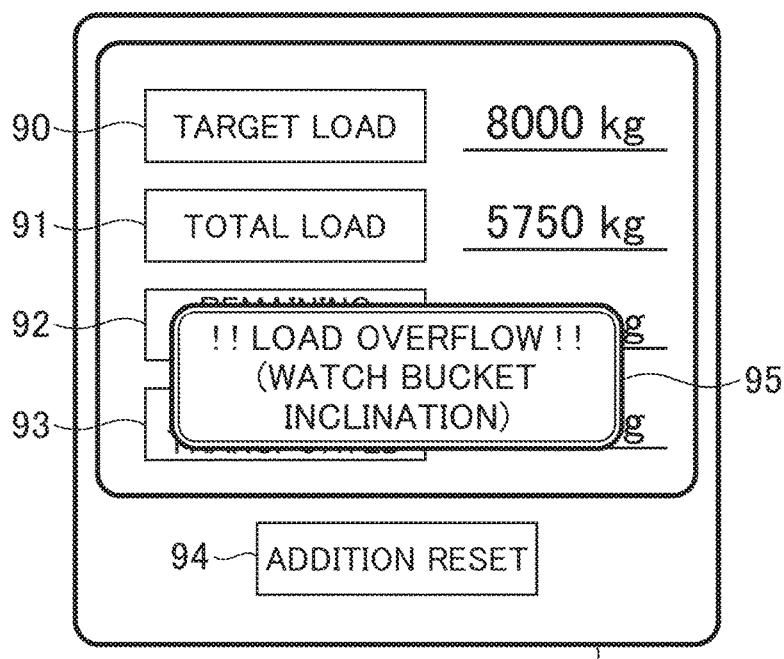
FIG. 17 is an external view depicting the output screen of the monitor 23 when a load overflow is estimated (when the load overflow estimation flag is ON).

The output information generating section 57 displays the load overflow notifying message 95 on the monitor 23 in step S123, and simultaneously displays a load overflow factor notifying message 98 according to the load overflow factor estimation result input in step S131 or S132. For example, when the absolute angle of the bucket 15 is outside the range of the load overflow factor determination reference value (that is, when step S132 is passed), it is estimated that the load overflow has occurred because the inclination (absolute angle) of the bucket 15 is a factor in the load overflow, and the operator is notified to pay attention to the inclination of the bucket 15 via the display of the monitor 23, as depicted in FIG. 17. Incidentally, though not depicted, when step S131 is passed and it is estimated that the load overflow factor is the swing speed, the swing speed is the factor in the load overflow, and thus a message prompting the operator to pay attention to the swing speed is displayed on the monitor 23. Incidentally, also in the example of FIG. 16, a message "measure again," which prompts for remeasurement by boom raising, may be displayed as the load overflow notifying message 95 as in the example of FIG. 13B.

According to the present embodiment configured as described above, the operator can be made to grasp a load overflow factor by displaying a load overflow factor estimation result on the monitor 23 on the basis of the posture (bucket absolute angle) and the movement state (swing angle) of the front work implement 12 when a load overflow has occurred and the load overflow factor reference value. Thus, the operator can objectively grasp an operation tendency of the operator himself/herself, and improvements in the skills of the operator can be expected to be promoted.

It is to be noted that the load overflow factor reference value in FIG. 16 is a mere example, and that the upper limit value (maximum value) and lower limit value (minimum value) of the bucket absolute angle may be set to be different values.

Third Embodiment

A third embodiment of the present invention will next be described. A system configuration diagram of a load measurement system according to the present embodiment is identical to that of the first embodiment depicted in FIG. 3, and therefore description thereof will be omitted.

Figure 18:
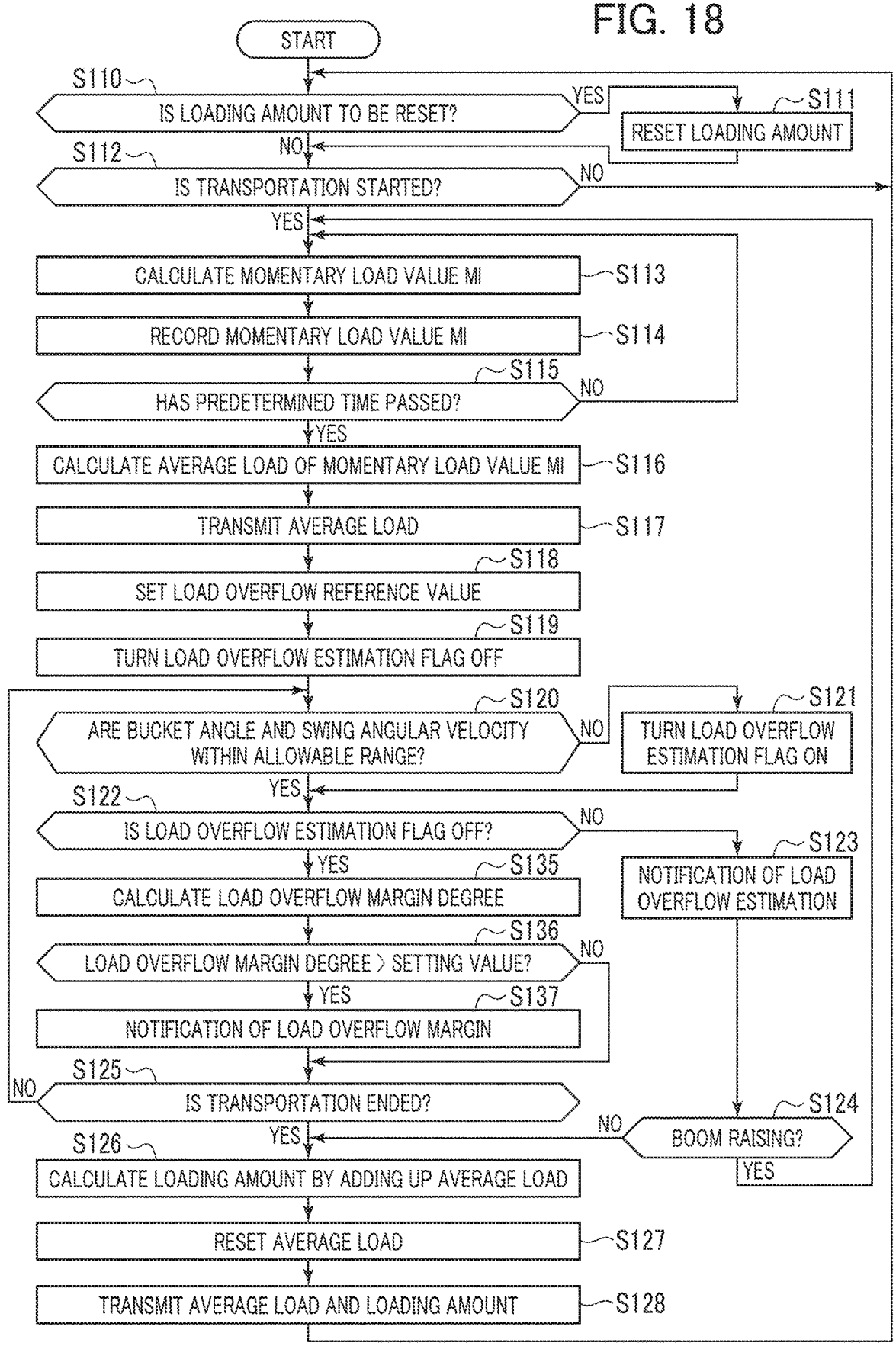
FIG. 18 is a flowchart of processing performed by a controller 21 according to a third embodiment.

FIG. 18 is a flowchart of processing performed by the controller 21 according to the third embodiment, and is different from FIG. 10 of the first embodiment in that the processing of steps S135, 136, and 137 is performed after step S122. Steps identified by the same references as in FIG. 10 are the same steps as in FIG. 10, and therefore description thereof will be omitted.

Figure 19:
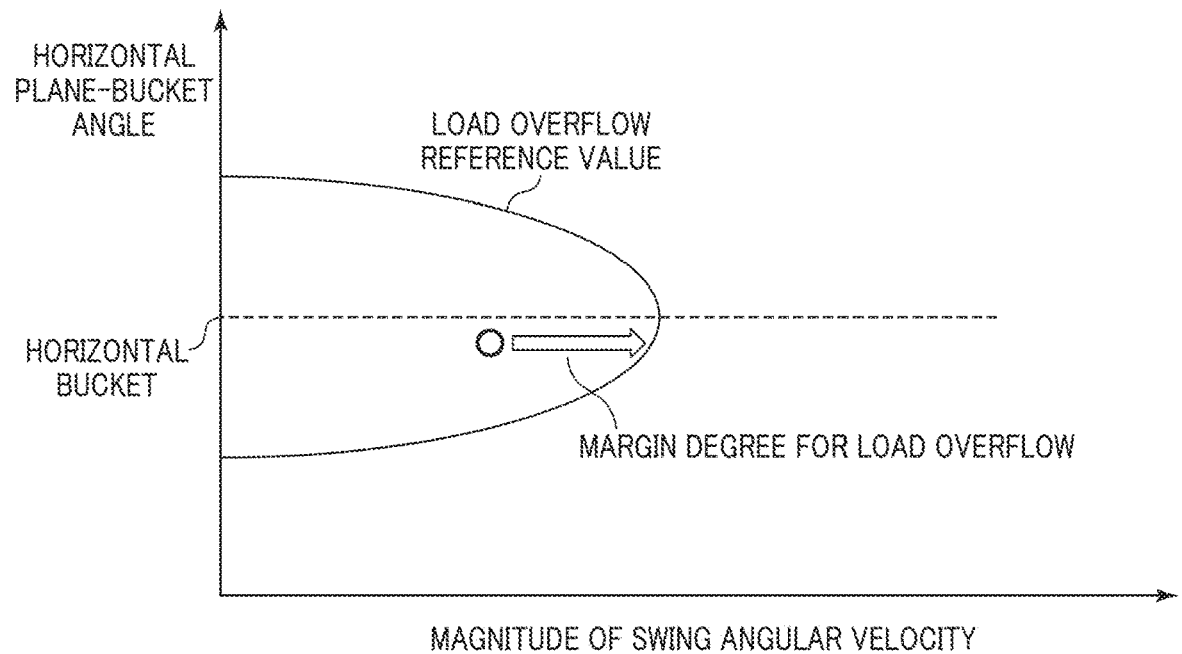
FIG. 19 is a diagram of assistance in explaining a load overflow margin degree according to the third embodiment.

After the load overflow estimating section 54 determines that a load overflow has occurred in step S120 and sets the load overflow estimation flag to ON in step S121, the load overflow estimating section 54 calculates, in step S135, a margin degree (load overflow margin degree) of the swing angular velocity of the upper swing structure 11 which swing angular velocity is calculated by the movement state calculating section 56 (physical quantity indicating the movement state of the front work implement 12) with respect to the load overflow reference value selected by the load overflow reference selecting section 53. Specifically, in step S135, the load overflow estimating section 54 calculates, as the margin degree for a load overflow, a distance (horizontal distance) in a direction of magnitude of the swing angular velocity between a point formed by a combination of the bucket angle calculated by the posture calculating section 55 and the swing angular velocity calculated by the movement state calculating section 56 at a time of the execution of step S135 and an ellipse defining the load overflow reference value, as depicted in FIG. 19. That is, a margin degree ωm for a load overflow can be calculated by the following Equation (9) by modifying Equation (1).

$$\Omega m = ((\omega sp)^2 \times (1-(\theta bk)^2/(\theta sp)^2))^{1/2} - \omega sw \qquad (9)$$

In the following step S136, the load overflow estimating section 54 determines whether or not the load overflow margin degree exceeds a predetermined setting value (threshold value). When the load overflow margin degree is equal to or less than the setting value, the load overflow estimating section 54 proceeds to step S125 to monitor whether or not transportation is ended. When the load overflow margin degree exceeds the setting value, on the other hand, the load overflow estimating section 54 outputs the margin degree calculated in step S135 to the output information generating section 57. The load overflow estimating section 54 then proceeds to step S137.

Figure 20:
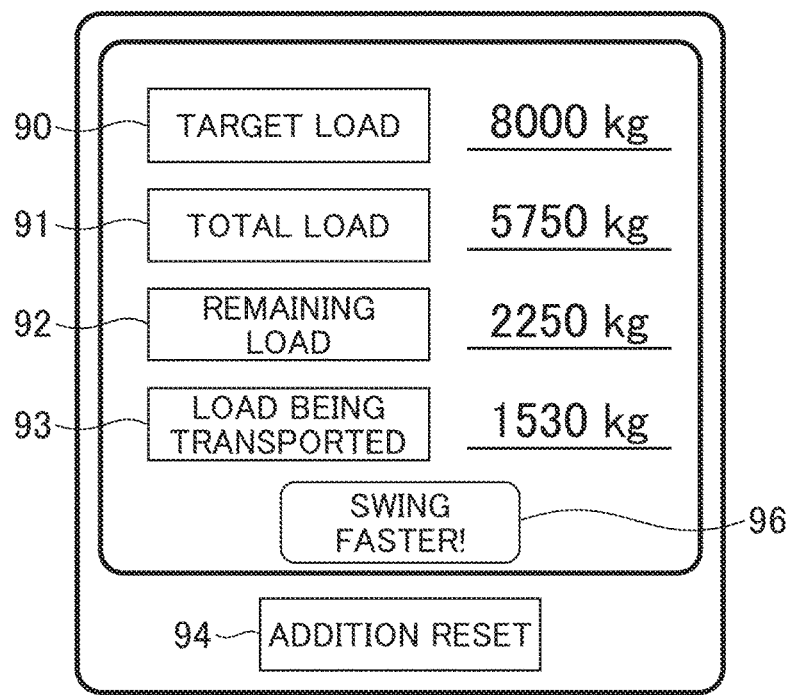
FIG. 20 is an external view depicting the output screen of the monitor 23 when no load overflow is estimated (when the load overflow estimation flag is OFF).

In step S137, the output information generating section 57 displays a margin degree message 96 with regard to a load overflow on the monitor 23 on the basis of the load overflow margin degree output in step S136 from the load overflow estimating section 54. When there is a margin in the magnitude of the swing angular velocity of the upper swing structure 11 for a load overflow, the operator is notified that no load overflow occurs even when the swing angular velocity (physical quantity indicating the movement state of the front work implement 12) is increased, as in the margin degree message 96 depicted in FIG. 20.

When the load overflow estimating section 54 thus estimates that no load overflow occurs, the operator is notified of the margin degree for a load overflow by displaying the margin degree message 96 on the monitor 23. The operator can therefore perform rapid operation in a range where no load overflow occurs, so that work efficiency can be improved. In addition, an appropriate operating method during transportation can be grasped, which leads to an improvement in skills of the operator.

Incidentally, while the margin degree of the swing speed is calculated and notified to the operator in the present embodiment, a margin degree of the bucket absolute angle, that is, a vertical direction distance in FIG. 19 (specifically, a distance in a direction of magnitude of the bucket angle between the point formed by the combination of the bucket angle and the swing angular velocity at a time of execution of step S135 and the ellipse defining the load overflow reference value) may be calculated and notified to the operator.

Fourth Embodiment

Figure 21:
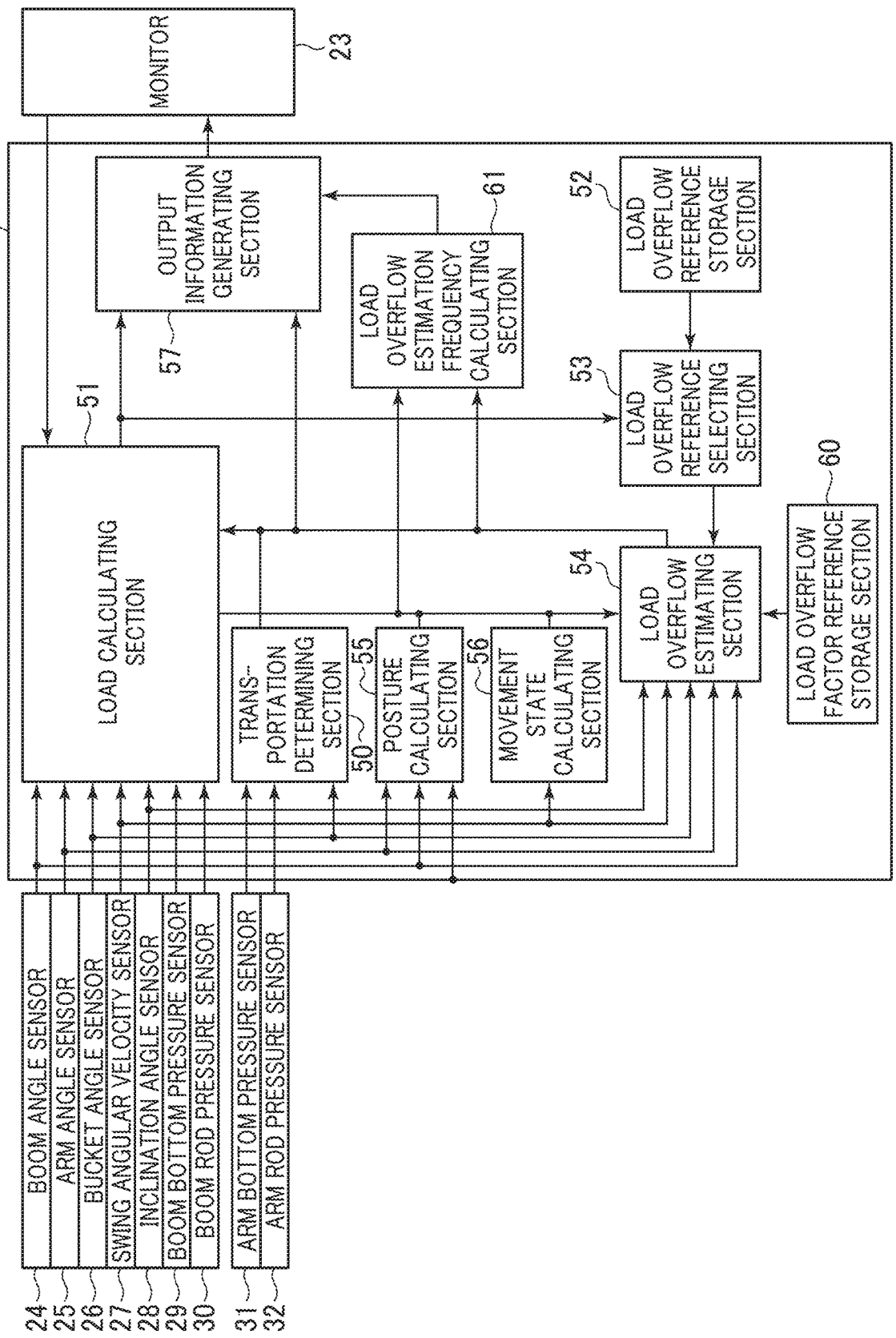
FIG. 21 is a system configuration diagram of a load measurement system according to a fourth embodiment.

A fourth embodiment of the present invention will next be described. FIG. 21 is a system configuration diagram of a load measurement system according to the fourth embodiment. The same parts as in the previous embodiments are identified by the same reference numerals, and description thereof may be omitted. The controller 21 according to the present embodiment functions as a load overflow estimation frequency calculating section 61 that counts the number of times (load overflow count) that the load overflow estimating section 54 estimates that the front work implement 12 has caused a load overflow during transportation of the work target object 4. When the number of times counted by the load overflow estimation frequency calculating section 61 exceeds a predetermined setting value, the monitor 23 further makes a notification prompting for a change of the load overflow reference value selected by the load overflow reference storage section 53. Incidentally, while the system of FIG. 21 is based on the system configuration of FIG. 15 according to the second embodiment having the load overflow factor reference storage section 60, a similar system can be constructed by adding the load overflow estimation frequency calculating section 61 to the system configuration of FIG. 10 according to the first embodiment.

Figure 22:
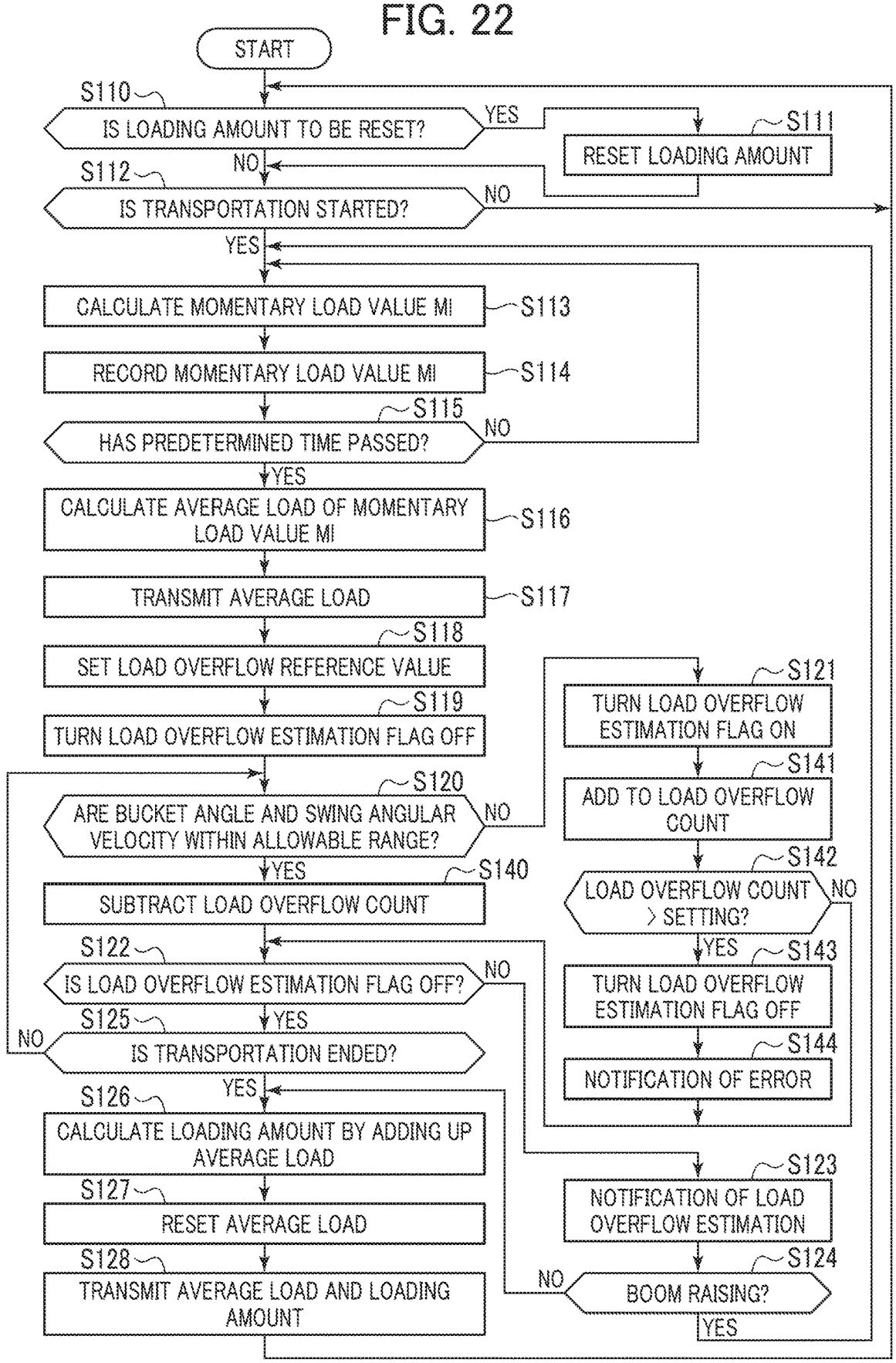
FIG. 22 is a flowchart of processing performed by a controller 21 according to the fourth embodiment.

FIG. 22 is a flowchart of processing performed by the controller 21 according to the fourth embodiment, and is different from FIG. 10 of the first embodiment in that the processing of step S140 is performed after step S120 and the processing of steps S141, 142, 143, and 144 is performed after step S121. Steps identified by the same references as in FIG. 10 are the same steps as in FIG. 10, and therefore description thereof will be omitted.

When the load overflow estimating section 54 does not estimate a load overflow in step S120, the load overflow estimation frequency calculating section 61 subtracts one from the load overflow count retained within the controller 21 in step S140. The load overflow estimation frequency calculating section 61 then proceeds to step S122.

When the load overflow estimating section 54 estimates a load overflow in step S120, on the other hand, the load overflow estimation frequency calculating section 61 adds one to the load overflow count in step S141 after step S121. The load overflow estimation frequency calculating section 61 then proceeds to step S142. In step S142, the load overflow estimation frequency calculating section 61 determines whether or not the load overflow count is higher than a setting value set in advance. When the count is equal to or less than the setting value, the load overflow estimation frequency calculating section 61 proceeds to step S122. When the count is higher than the setting value, on the other hand, the load overflow estimation frequency calculating section 61 sets the load overflow estimation flag to OFF in step S143, and outputs an error signal to the output information generating section 57 in the following step S144.

Figure 23:
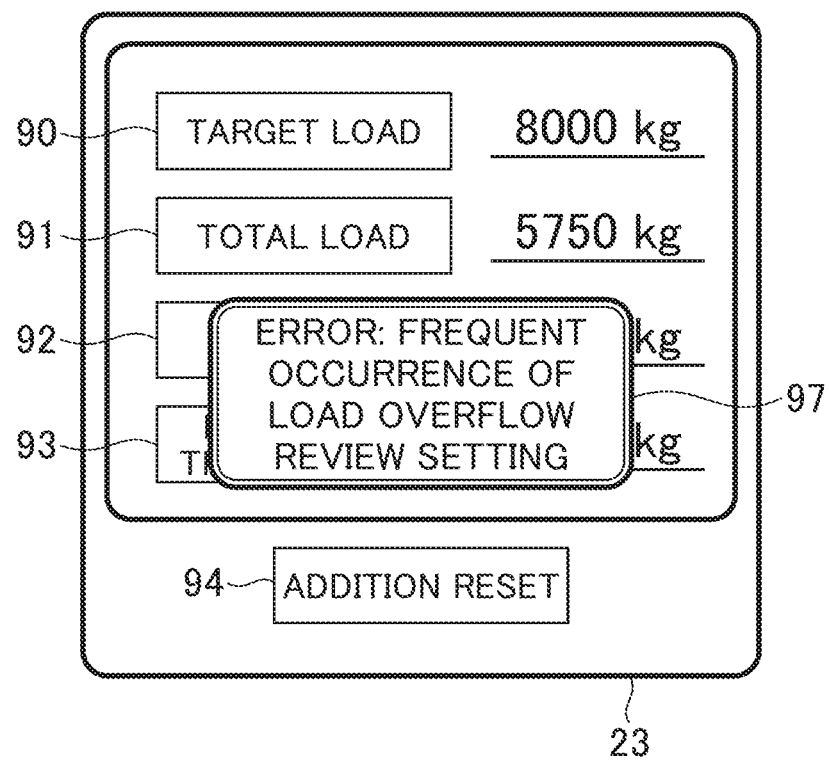
FIG. 23 is an external view depicting the output screen of the monitor 23 when a load overflow is estimated (when the load overflow estimation flag is ON).

When the error signal is output from the load overflow estimation frequency calculating section 61 in step S144, the output information generating section 57 displays a load overflow reference value setting change notifying message 97 prompting for a change of a setting of the load overflow reference value of the load overflow reference storage section 52 on the monitor 23, as depicted in FIG. 23. That is, when a load overflow is estimated frequently, the operator is notified to review the setting of the load overflow reference value of the load overflow reference storage section 52.

By thus prompting for a change of the setting of the load overflow reference according to load overflow estimation frequency, it is possible to grasp that the setting of the load overflow reference value stored in the load overflow reference storage section 52 is inappropriate for the environment of the work site, and load overflow estimation suitable for the environment of the work site can be performed by correcting the setting.

Fifth Embodiment

A fifth embodiment of the present invention will next be described. A system configuration diagram of a load measurement system according to the present embodiment is identical to that of the first embodiment depicted in FIG. 3, and therefore description thereof will be omitted.

Figure 26:
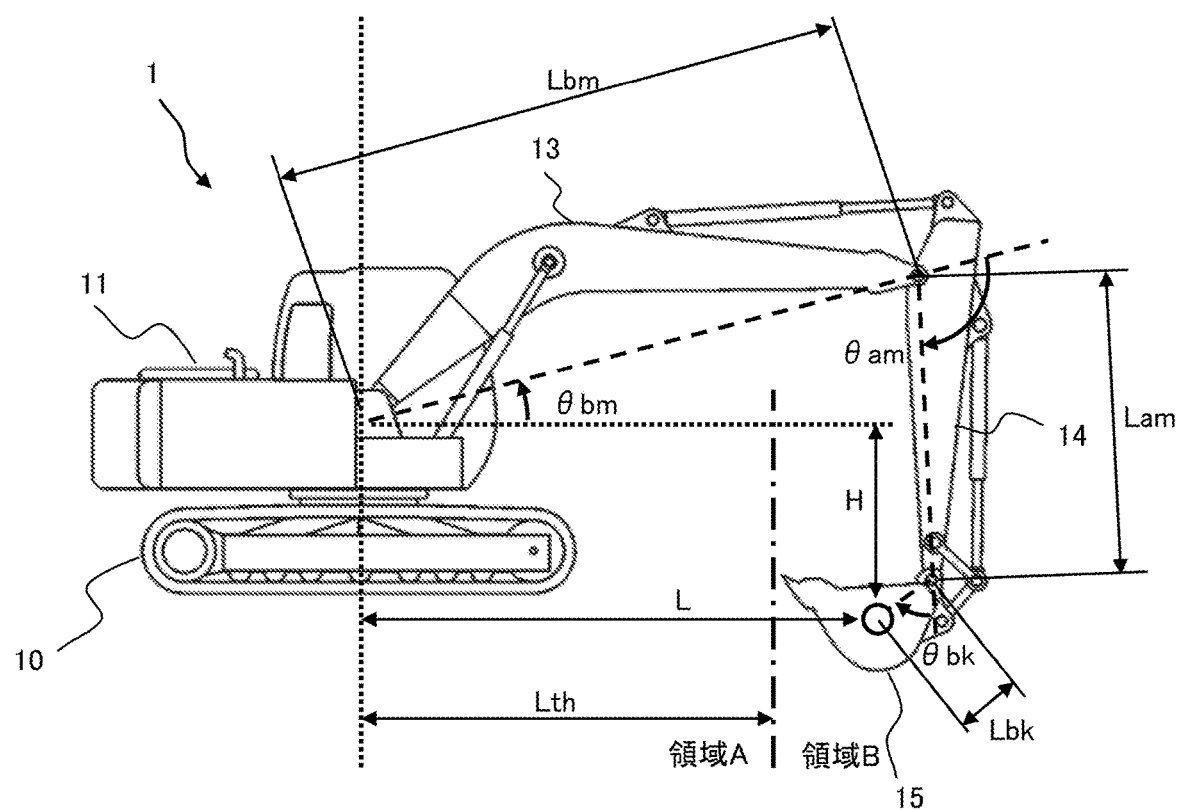
FIG. 26 is a diagram of assistance in explaining a bucket center position L and H calculated in step S150 in FIG. 25.
Figure 27:
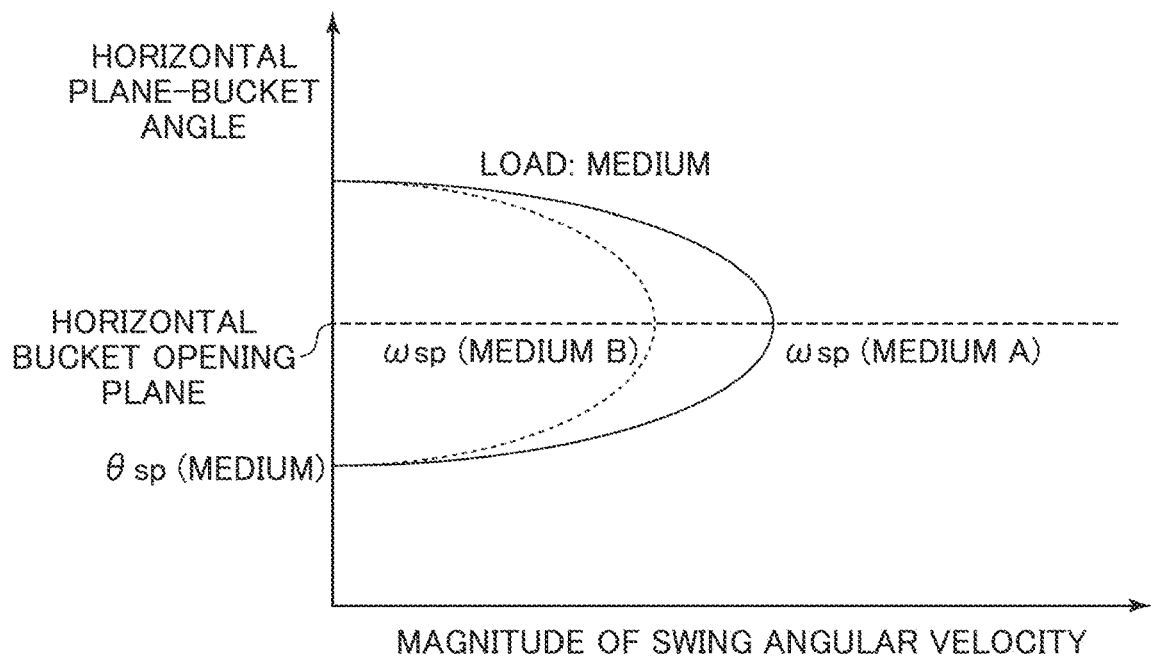
FIG. 27 is a graph of load overflow reference values related to steps S151 to 153 in FIG. 25.

In the present embodiment, first, the posture of the front work implement 12 which posture is calculated by the posture calculating section 55 includes a horizontal direction distance L (see FIG. 26) from the upper swing structure 11 (main body of the machine body) to the bucket 15 located at a front end portion of the front work implement 12. The area of an ellipse defining a load overflow reference value is defined so as to increase in the direction of the swing angular velocity as depicted in FIG. 27 according to a decrease in the horizontal direction distance L (in other words, the length in a major axis direction of the ellipse is defined so as to increase according to a decrease in the horizontal direction distance L).

In addition, in the present embodiment, the posture calculating section 55 calculates the position of the bucket 15 as the posture of the front work implement 12. The movement state calculating section 56 calculates a horizontal direction acceleration and a vertical direction acceleration of the bucket 15 as physical quantities indicating the movement state of the front work implement 12 on the basis of the position of the bucket 15 which position is calculated by the posture calculating section 55. The load overflow reference values stored in the load overflow reference storage section 52 are defined as predetermined regions on a coordinate system having the vertical direction acceleration of the bucket 15 as a first axis and having the horizontal direction acceleration of the bucket 15 as a second axis (see FIG. 27). The regions are a plurality of regions plurally defined for respective load values (average weighting) of the work target object 4 (see FIG. 27). The load overflow reference selecting section 53 selects one load overflow reference value from a plurality of the load overflow reference values stored in the load overflow reference storage section 52 on the basis of the load value (average load) of the work target object 4 which load value (average load) is calculated by the load calculating section 51. When the vertical direction acceleration and the horizontal direction acceleration of the bucket 15 which accelerations are calculated by the movement state calculating section 56 are included on the outside of a region defined by the load overflow reference value selected by the selecting section 53, the load overflow estimating section 54 determines that the front work implement 12 has caused a load overflow during transportation of the work target object.

Figure 24:
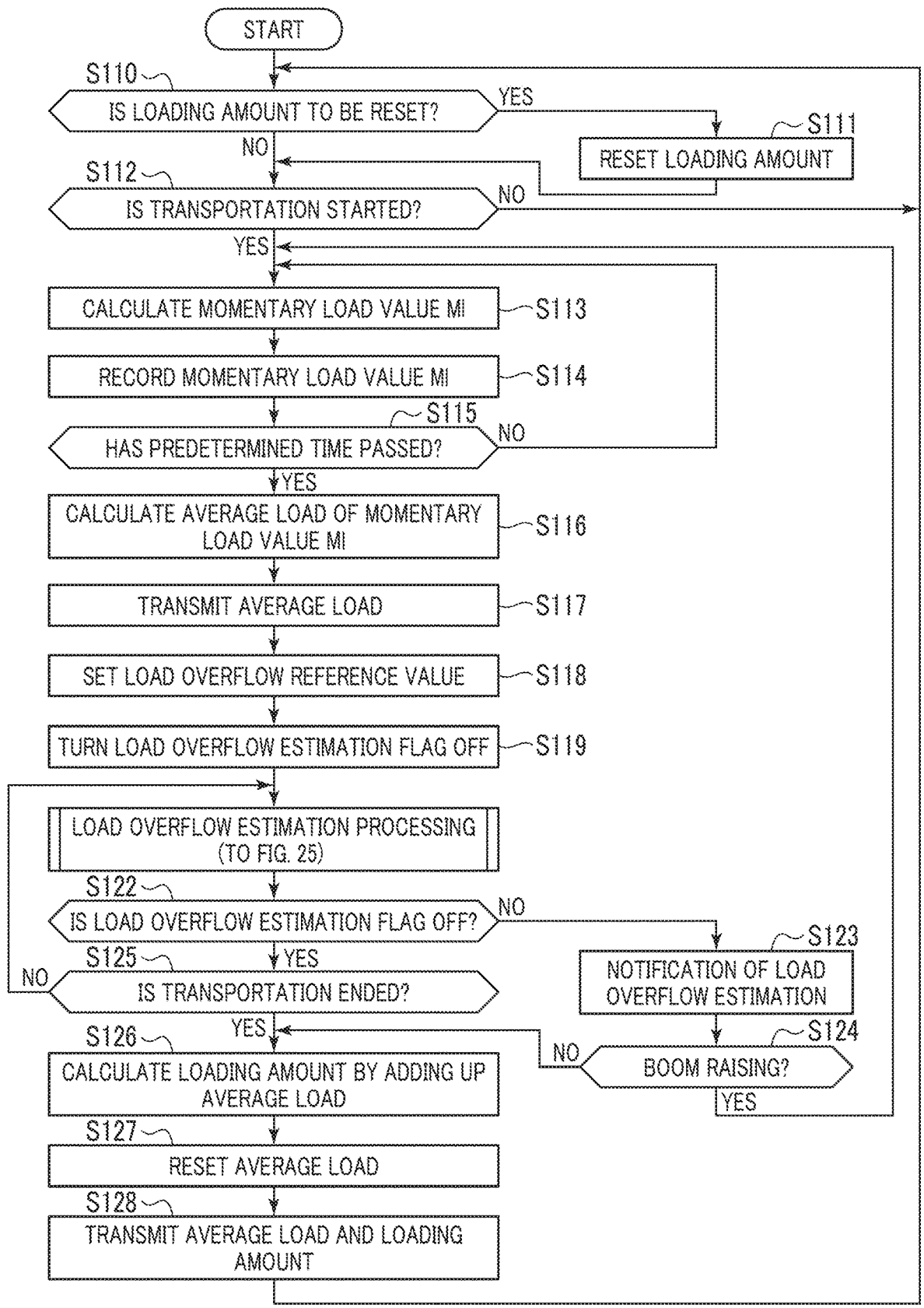
FIG. 24 is a flowchart of processing performed by a controller 21 according to a fifth embodiment.
Figure 25:
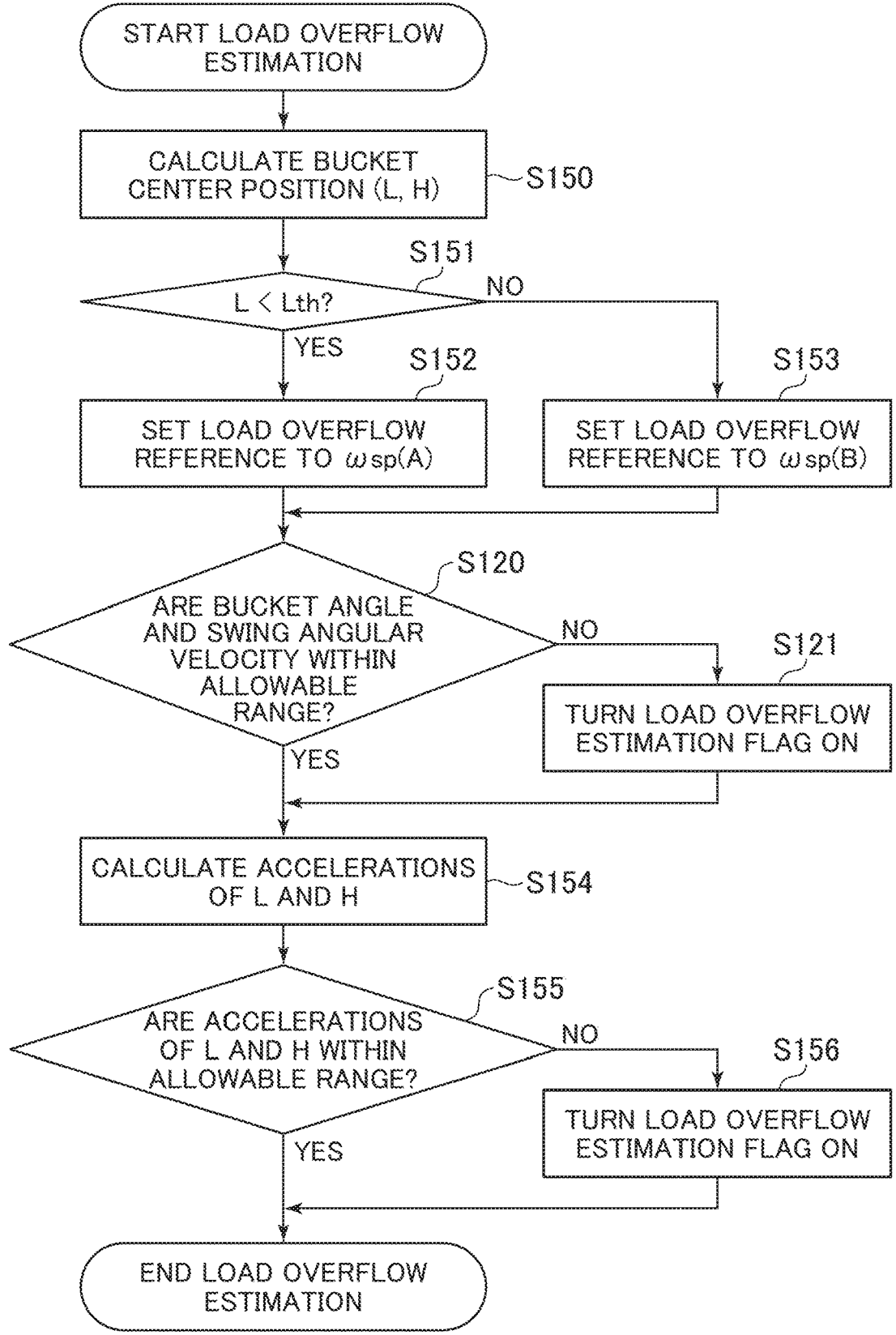
FIG. 25 is a flowchart of load overflow estimation processing in FIG. 24.
Figure 28:
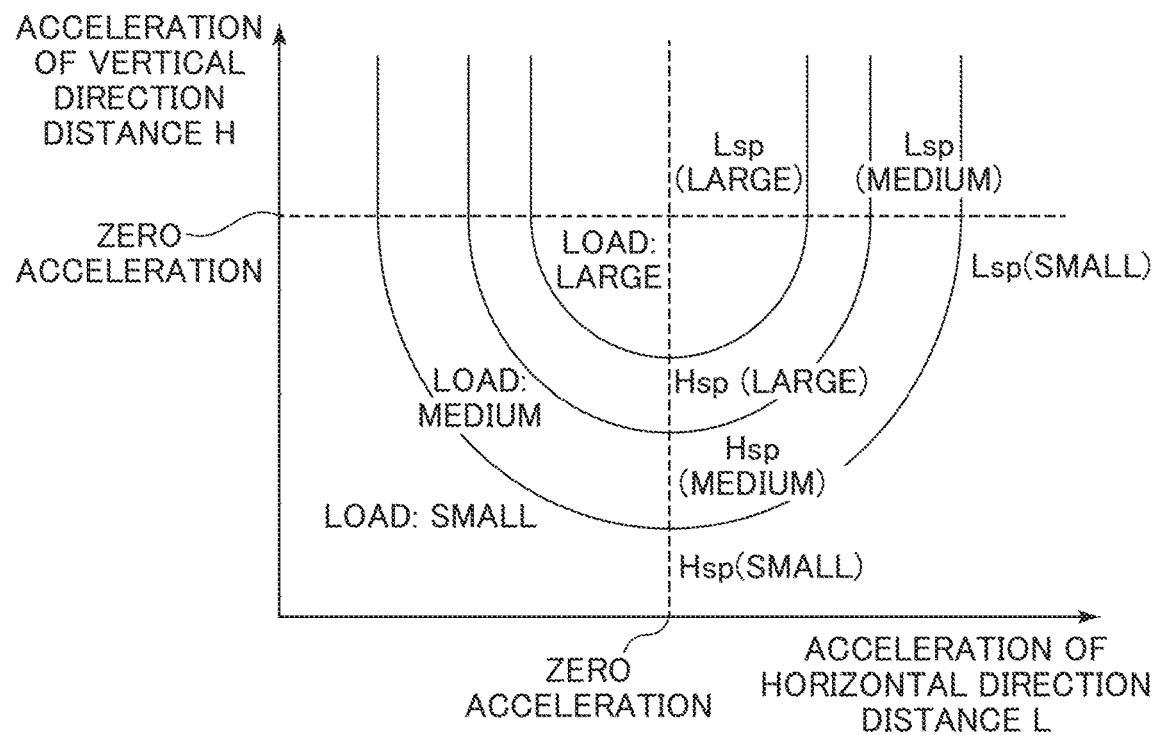
FIG. 28 is a graph of load overflow reference values related to steps S15 to 156 in FIG. 25.

FIG. 24 is a flowchart of processing performed by the controller 21 according to the fifth embodiment, and is different from FIG. 10 of the first embodiment in that load overflow estimation processing depicted in FIG. 25 is performed after step S119, and the processing from step S122 on down is performed after the load overflow estimation processing of FIG. 25. In FIGS. 24 and 25, steps identified by the same references as in FIG. 10 are the same steps as in FIG. 10, and therefore description thereof will be omitted. FIG. 26 is a diagram of assistance in explaining a bucket center position L and H calculated in step S150 in FIG. 25. FIG. 27 is a graph of load overflow reference values related to steps S151 to 153 in FIG. 25. FIG. 28 is a graph of load overflow reference values related to steps S15 to 156 in FIG. 25.

In step S150 in FIG. 25, the posture calculating section 55 calculates a horizontal direction distance L and a vertical direction distance H from the center of rotation of the boom 13 to the center of the bucket by the following Equations (10) and (11), respectively.

$$H = Lbm \cdot \sin(\theta bm) + Lam \cdot \sin(\theta bm + \theta am) + Lbk \cdot \sin(\theta bm + \theta am + \theta bm) \quad (10)$$

$$L = Lbm \cdot \cos(\theta bm) + Lam \cdot \cos(\theta bm + \theta am) + Lbk \cdot \cos(\theta bm + \theta am + \theta bm) \quad (11)$$

In the following step S151, the load overflow estimating section 54 determines whether or not the horizontal direction distance L calculated in step S150 is larger than a setting value Lth of horizontal direction distance with respect to the center of rotation of the boom, the setting value Lth being set in advance. When the horizontal direction distance L calculated in step S150 is larger, the load overflow estimating section 54 determines that the center of the bucket is present in a region B in FIG. 26. The load overflow estimating section 54 then proceeds to step S153. When the horizontal direction distance L is equal to or less than the setting value Lth, on the other hand, the load overflow estimating section 54 determines that the center of the bucket is present in a region A in FIG. 26. The load overflow estimating section 54 then proceeds to step S152.

When the horizontal direction distance L is relatively large, a swing radius is large, and a centrifugal force and an inertial force generated by a swing are increased. Thus, when the swing angular velocity is increased, a load overflow tends to occur. Conversely, when the horizontal direction distance L is relatively small, the swing radius is small, and a load overflow does not occur easily even at a high swing angular velocity. Therefore, in a case where a region surrounding the hydraulic excavator 1 is divided into the two regions A and B in the horizontal direction as depicted in FIG. 27, the load overflow reference value becomes different ranges depending on in which region the center of the bucket is located even when the excavated object 4 is the same load (average load in step S116). Incidentally, while only the load overflow reference value of the load (medium) is displayed in the example of FIG. 27, and the load overflow reference values of the load (small) and the load (large) are omitted, it is needless to say that the lengths in the major axis direction of the ellipses change according to the position of the center of the bucket as in the case of the load (medium). Incidentally, while the load overflow reference value is corrected for the two divided regions A and B in the example of FIG. 27, the load overflow reference value may be defined such that the length in the major axis direction of the ellipse (length in a swing angular velocity direction) monotonically increases according to decrease in the horizontal direction distance L.

In step S152 (when the center of the bucket is present in the region A), the load overflow estimating section 54 sets the load overflow reference value to cusp (medium A) of the region A as indicated by a solid line ellipse in FIG. 27. The load overflow estimating section 54 then proceeds to step S120. When the load overflow estimating section 54 proceeds to step S153 (when the center of the bucket is present in the region B), the load overflow estimating section 54 sets the load overflow reference value to cusp (medium B) of the region B as indicated by a dotted line ellipse in FIG. 27. The load overflow estimating section 54 then proceeds to step S120.

In step S120, the load overflow estimating section 54 determines the presence or absence of a load overflow as in the previous embodiments by using the load overflow reference value selected in step S152 or step S153. When it is determined that there is a load overflow, the load overflow estimating section 54 sets the load overflow estimation flag to ON in step S121. The load overflow estimating section 54 then proceeds to step S154. When it is determined that there is no load overflow, on the other hand, the load overflow estimating section 54 skips step S121 and proceeds to step S154.

In step S154, the movement state calculating section 56 calculates accelerations of L and H (that is, the horizontal direction acceleration and the vertical direction acceleration of the bucket 15) by performing second order differential for the horizontal direction distance L and the vertical direction distance H of the bucket center position. The movement state calculating section 56 then proceeds to step S155.

When the absolute value of the acceleration of the horizontal direction distance L is increased in a state in which the acceleration of the vertical direction distance H is zero, a part of the excavated object 4 which part projects from the opening plane of the bucket 15 overflows and drops easily due to an inertial force acting on the bucket 15. In addition, when the acceleration of the vertical direction distance H is decreased in a state in which the acceleration of the horizontal direction distance L is zero, that is, when acceleration acts in a direction in which the bucket 15 falls, the part of the excavated object 4 which part projects from the opening plane of the bucket 15 overflows and drops easily. When these relations are expressed, the load overflow reference values based on the magnitudes of the accelerations of the vertical direction distance H and the horizontal direction distance L of the center position of the bucket 15 are defined in an elliptic form in a case where the acceleration of the vertical direction distance H is equal to or less than zero, and defined in a rectangular form such that only the magnitude of the acceleration of the horizontal direction distance L is considered in a case where the acceleration of the vertical direction distance H is equal to or more than zero, as depicted in FIG. 28. In a case where the load of the excavated object 4 is large, a large part of the excavated object 4 projects from the opening plane of the bucket 15, and the excavated object 4 overflows easily. Thus, the allowable range is decreased, as depicted in FIG. 27. In a case where the load of the excavated object 4 is small, on the other hand, a small part of the excavated object 4 projects from the opening plane of the bucket 15, and the excavated object 4 does not overflow easily. Thus, the allowable range is increased as depicted in the graph of FIG. 27, and a margin occurs.

In step S155, the load overflow estimating section 54 further determines whether or not a combination of the accelerations of the bucket center position L and H is positioned within a load overflow reference value in FIG. 28. That is, the load overflow estimating section 54 determines whether or not the magnitudes of the accelerations of the vertical direction distance H and the horizontal direction distance L of the bucket center position are within the allowable range depicted in FIG. 28 as in step S120. When the magnitudes of the accelerations of the vertical direction distance H and the horizontal direction distance L of the bucket center position are within the allowable range, the load overflow estimating section 54 directly ends the processing. When the magnitudes of the accelerations of the vertical direction distance H and the horizontal direction distance L of the bucket center position are outside the allowable range, the load overflow estimating section 54 sets the load overflow estimation flag to ON in step S156, and then ends the processing.

Thus, a load overflow reference index is not limited to the bucket absolute angle and the magnitude of the swing angular velocity (that is, the moving speed of the bucket 15), but may include the horizontal direction distance, the horizontal direction acceleration, and the vertical direction acceleration of the bucket 15. Further, load overflow references may be set by mapping a plurality of references into equal to or more than three dimensions. In addition, it is obvious that the load overflow references are not limited to fixed load overflow references, but may be configured to be externally settable via the monitor 23, for example.

Incidentally, while the fifth embodiment uses both of the load overflow reference value constituted of the bucket absolute angle and the swing angular velocity depicted in FIG. 7 and the like and the load overflow reference value constituted of the accelerations of the vertical direction distance H and the horizontal direction distance L of the bucket center position in FIG. 28, the occurrence or nonoccurrence of a load overflow may be determined by using only the latter load overflow reference value.

<Others>

It is to be noted that the present invention is not limited to the foregoing embodiments, but includes various modifications within a scope not departing from the spirit of the present invention. For example, the present invention is not limited to including all of the configurations described in the foregoing embodiments, but includes configurations obtained by omitting a part of the configurations. In addition, a part of a configuration according to a certain embodiment can be added to or replaced with a configuration according to another embodiment.

For example, the hydraulic excavator 1 used for the description of the present invention has the upper swing structure 11, the boom 13, the arm 14, and the bucket 15. However, the configuration of the work machine is not limited to this, but the present invention is applicable to work machines having front work implements in different forms, such as a lifting magnet machine, for example.

In addition, the transportation start determination in the transportation determining section 50 is not limited to a method using the arm cylinder bottom pressure and the bucket angle as described above. For example, in a case of a work machine such as a lifting magnet machine or the like, it is easy to determine a start and an end of transportation operation on the basis of a magnet attraction ON/OFF signal.

It is obvious that load calculation is not limited to the model depicted in FIG. 9, but may use a different calculation equation. For example, a load may be calculated on the basis of a equation of motion of the front work implement 12 formed by the boom 13, the arm 14, and the bucket 15.

A method of determining the load value of the excavated object 4 is not limited to the method depicted in FIG. 10. For example, a period in which the rotational acceleration of the boom 13 is equal to or less than a predetermined value may be extracted, and the load value of the excavated object 4 may be determined by averaging the load in the period. It is obvious that the detection of boom raising operation for measuring the load again is not limited to boom angle detection, but an amount of operating input to the operation device 22, the position of a claw tip of the bucket 15, or the like may be detected.

The load overflow reference values are not limited to those depicted in FIG. 7, FIG. 12, and the like. For example, the magnitude of the swing speed of the upper swing structure 11 may be replaced with an amount of swing operation of the operator.

In order to actively notify the operator of completion of recalculation of the average load value in response to the boom raising operation after a load overflow estimation is notified, not only is the numerical value of the load-being-transported display section 93 updated in step S117, but also the monitor 23 may make display indicating the completion of calculation of the average load value after a load overflow.

The load overflow factor determination reference is not limited to the setting depicted in FIG. 15, but an upper limit of the magnitude of the swing speed may be set.

It is obvious that a method of calculating the margin degree for a load overflow is not limited to the method depicted in FIG. 17, but may calculate and display a margin degree for the absolute angle of the bucket.

In each of the foregoing embodiments, the load overflow reference value is changed according to the load value of the excavated object 4. However, in a case where the load value of the excavated object does not vary greatly, a system configuration may be made so as to use only one load overflow reference value set in advance.

DESCRIPTION OF REFERENCE CHARACTERS

1: Hydraulic excavator
2: Dump truck
12: Front work implement
13: Boom
14: Arm
15: Bucket
16: Boom cylinder
17: Arm cylinder
18: Bucket cylinder
21: Controller
22: Control lever (operation device)
23: Monitor (display device input device)
24: Boom angle sensor
25: Arm angle sensor
26: Bucket angle sensor
27: Swing angular velocity sensor
28: Inclination angle sensor
29: Boom bottom pressure sensor
30: Boom rod pressure sensor
31: Arm bottom pressure sensor
32: Arm rod pressure sensor
50: Transportation determining section
51: Load calculating section
52: Load overflow reference storage section (storage device)
53: Load overflow reference selecting section
54: Load overflow estimating section
55: Posture calculating section
56: Movement state calculating section
60: Load overflow factor reference storage section (storage device)
61: Load overflow estimation frequency calculating section

The invention claimed is:

1. A work machine comprising:
a multijoint type work implement having a bucket;
an actuator configured to drive the work implement;
an operation device configured to generate a speed command for the actuator according to an operation amount; and
a controller configured to calculate a load value of a work target object on a basis of thrust information of the actuator while the work implement is transporting the work target object to a position above a transporting machine,
the controller
including a storage device configured to store a reference value for estimating whether or not a load overflow of the work target object from the bucket has occurred, the reference value being defined by a mutual relation between the load value of the work target object, a posture of the work implement, and a movement state of the work implement,
calculating the posture of the work implement,
calculating a physical quantity indicating the movement state of the work implement,
estimating whether or not the work implement has caused the load overflow during transportation of the work target object on a basis of the reference value stored in the storage device, the load value of the work target object, the posture of the work implement, and the physical quantity indicating the movement state of the work implement, and
further including a notifying device configured to make a notification of determination of occurrence of the load overflow by the controller.

2. The work machine according to claim 1, wherein
the storage device further stores a reference value for determining which of the posture and the movement state of the work implement is a factor in the load overflow,
when the controller determines that the work implement has caused the load overflow during the transportation of the work target object, the controller estimates the factor in the load overflow on a basis of the reference value stored in the storage device, the posture of the work implement, and the physical quantity indicating the movement state of the work implement, and
the notifying device further makes a notification of the factor in the load overflow, the factor being estimated by the controller.

3. The work machine according to claim 1, wherein
the controller further calculates a margin degree of the physical quantity indicating the movement state of the work implement with respect to the reference value stored in the storage device, and
when the margin degree exceeds a threshold value, the notifying device further notifies that the load overflow does not occur even when the physical quantity indicating the movement state of the work implement is increased.

4. The work machine according to claim 1, wherein
the controller counts the number of times that a load overflow estimating section estimates that the work implement has caused the load overflow during the transportation of the work target object, and
the notifying device further makes a notification prompting for changing of the reference value stored in the storage device when the number of times exceeds a predetermined value.

5. The work machine according to claim 1, wherein
the controller calculates an angle of the bucket with respect to a horizontal plane as the posture of the work implement,
the controller calculates a moving speed of the work implement as the physical quantity indicating the movement state of the work implement,
the reference value stored in the storage device is defined as a predetermined region on a coordinate system having the angle of the bucket with respect to the horizontal plane as a first axis, and having the moving speed of the work implement as a second axis, and the region is a plurality of regions plurally defined for respective load values of the work target object,
the controller selects one region from the plurality of regions stored in the storage device on a basis of the load value of the work target object, and
the controller determines that the work implement has caused the load overflow during the transportation of the work target object when the angle of the bucket with respect to the horizontal plane and the moving speed of the work implement are included in an outside of the selected region.

6. The work machine according to claim 5, wherein
the posture of the work implement includes a horizontal direction distance from the work machine to a front end portion of the work implement, and an area of the region is defined so as to increase according to a decrease in the horizontal direction distance.

7. The work machine according to claim 1, wherein
the controller calculates a position of the bucket as the posture of the work implement,
the controller calculates a vertical direction acceleration and a horizontal direction acceleration of the bucket as the physical quantity indicating the movement state of the work implement on a basis of the position of the bucket,
the reference value stored in the storage device is defined as a predetermined region on a coordinate system having the vertical direction acceleration of the bucket as a first axis, and having the horizontal direction acceleration of the bucket as a second axis, and the region is a plurality of regions plurally defined for respective load values of the work target object,
the controller selects one region from the plurality of regions stored in the storage device on a basis of the load value of the work target object, and
the controller determines that the work implement has caused the load overflow during the transportation of the work target object when the vertical direction acceleration and the horizontal direction acceleration of the bucket are included in an outside of the selected region.

* * * * *